US011267480B2

(12) United States Patent
Tamagaki et al.

(10) Patent No.: US 11,267,480 B2
(45) Date of Patent: Mar. 8, 2022

(54) TRAVEL CONTROL APPARATUS AND TRAVEL CONTROL METHOD

(71) Applicant: DENSO CORPORATION, Kariya (JP)

(72) Inventors: Mitsuo Tamagaki, Kariya (JP); Hiroaki Tanaka, Kariya (JP); Ifushi Shimonomoto, Kariya (JP); Akira Kamiya, Kariya (JP); Takuya Mori, Kariya (JP); Yuki Fujisawa, Kariya (JP); Ayako Kotani, Kariya (JP)

(73) Assignee: DENSO CORPORATION, Kariya (JP)

( * ) Notice: Subject to any disclaimer, the term of this patent is extended or adjusted under 35 U.S.C. 154(b) by 90 days.

(21) Appl. No.: 16/743,299

(22) Filed: Jan. 15, 2020

(65) Prior Publication Data
US 2020/0148214 A1    May 14, 2020

Related U.S. Application Data

(63) Continuation-in-part of application No. 15/561,927, filed as application No. PCT/JP2016/001784 on Mar. 28, 2016, now Pat. No. 10,583,843.

(30) Foreign Application Priority Data

Apr. 3, 2015    (JP) .............................. JP2015-077083
Feb. 4, 2016    (JP) .............................. JP2016-019920

(51) Int. Cl.
*B60W 40/09*    (2012.01)
*G05D 1/00*    (2006.01)
(Continued)

(52) U.S. Cl.
CPC .......... *B60W 40/09* (2013.01); *B60W 60/007* (2020.02); *G05D 1/0061* (2013.01);
(Continued)

(58) Field of Classification Search
CPC ................. B60W 30/14; B60W 40/09; B60W 2540/229; B60W 50/14; B60W 30/12;
(Continued)

(56) References Cited

U.S. PATENT DOCUMENTS

2003/0187704 A1    10/2003    Hashiguchi et al.
2005/0267684 A1*   12/2005    Kawakami ........... B62D 15/026
                                                                701/301
(Continued)

FOREIGN PATENT DOCUMENTS

JP    2000-301963 A    10/2000
JP    2006-327326 A    12/2006
(Continued)

*Primary Examiner* — Stephen Holwerda
(74) *Attorney, Agent, or Firm* — Maschoff Brennan

(57) ABSTRACT

A travel control apparatus is provided. The travel control apparatus acquires driver abnormality information indicative of an abnormality of a driver of a vehicle, makes a determination that the driver is in a driving difficulty state based at least on the driver abnormality information, and activates a lane departure prevention function and a cruise control function of the vehicle at substantially the same time during a time period between when the driver abnormality information is acquired and when the driving difficulty state is determined. Together with activating the lane departure prevention function and the cruise control function, the travel control apparatus outputs notification request information to a human machine interface controller controlling a notification device which issues a notification to a passenger of the vehicle. The notification request information causes the notification indicative of activation of the lane departure prevention function and the cruise control function to be issued.

4 Claims, 26 Drawing Sheets

(51) Int. Cl.
*B60W 60/00* (2020.01)
*G06K 9/00* (2022.01)

(52) U.S. Cl.
CPC ....... *G05D 1/0088* (2013.01); *G06K 9/00845* (2013.01); *B60W 2540/229* (2020.02)

(58) Field of Classification Search
CPC . B60W 60/007; G06K 9/00845; B60K 28/06; G05D 1/0088; G05D 1/0061
See application file for complete search history.

(56) References Cited

U.S. PATENT DOCUMENTS

| | | |
|---|---|---|
| 2006/0212202 A1 | 9/2006 | Ota |
| 2007/0008083 A1 | 1/2007 | Berg et al. |
| 2008/0252466 A1 | 10/2008 | Yopp et al. |
| 2011/0241862 A1* | 10/2011 | Debouk ............. B60W 50/035 340/439 |
| 2012/0025993 A1* | 2/2012 | Akiyama ............. A61B 5/18 340/576 |
| 2013/0018549 A1 | 1/2013 | Kobana et al. |
| 2013/0226408 A1* | 8/2013 | Fung ............. B62D 6/007 701/41 |
| 2013/0342330 A1* | 12/2013 | Kiefer ............. B60N 2/90 340/407.1 |
| 2015/0066284 A1* | 3/2015 | Yopp ............. B60W 50/10 701/29.2 |
| 2018/0111628 A1 | 4/2018 | Tamagaki et al. |

FOREIGN PATENT DOCUMENTS

| | | |
|---|---|---|
| JP | 2007-118804 A | 5/2007 |
| JP | 2008-037218 A | 2/2008 |
| JP | 2008-123112 A | 5/2008 |
| JP | 2011-118831 A | 6/2011 |
| JP | 2014-021767 A | 2/2014 |
| JP | 2014-024367 A | 2/2014 |
| JP | 2014-044707 A | 3/2014 |
| JP | 2014-058229 A | 4/2014 |
| JP | 2015-054547 A | 3/2015 |
| WO | WO 2013/008299 A1 | 1/2013 |
| WO | WO 2016/157816 A1 | 10/2016 |

* cited by examiner

TRAVEL CONTROL APPARATUS AND TRAVEL CONTROL METHOD

CROSS REFERENCE TO RELATED APPLICATION

This application is a continuation-in-part application of U.S. patent application Ser. No. 15/561,927, filed Sep. 26, 2017, which is a national entry of International Patent Application No. PCT/JP2016/001784 filed on Mar. 28, 2016, which designated the U.S. and claims the benefit of priority from Japanese Patent Application No. 2015-77083 filed on Apr. 3, 2015 and Japanese Patent Application No. 2016-19920 filed on Feb. 4, 2016. The entire discloses of all of the above applications are incorporated herein by reference.

TECHNICAL FIELD

The present disclosure relates to a travel control apparatus and a travel control method that control the travel of a vehicle.

BACKGROUND ART

When the driver of a vehicle has difficulty in driving the vehicle, a conventionally known travel control apparatus described, for example, in Patent Literature 1 automatically stops a vehicle instead of the driver. Upon detecting an abnormality of the driver, the travel control apparatus performs an intention confirmation process to ask the driver whether automatic evacuation is required. When the result of the intention confirmation process indicates that the driver has difficulty in driving the vehicle, the travel control apparatus begins control for automatic evacuation.

PRIOR ART LITERATURES

Patent Literature

Patent Literature 1: WO 2013/008299 A1

SUMMARY

In order to avoid an incorrect determination of the condition of the driver, the travel control apparatus described, for example, in Patent Literature 1 requires an interval, for example, of several seconds between the detection of abnormality and the determination of driving difficulty. Such an interval may pose the vehicle to be not thoroughly manipulated by the driver having truly difficulty in driving the vehicle; thereby the vehicle may be placed in an unstable traveling state before the start of automatic evacuation. This may cause difficulty in switching to the control for automatic evacuation.

It is an object of the present disclosure to provide a travel control apparatus and a travel control method that ensure proper switching to automatic evacuation control when a driver has difficulty in driving a vehicle.

To achieve the above object, according to an aspect of the present disclosure, a travel control apparatus is provided to include: an abnormality information acquisition section that acquires information indicating that an abnormality of a driver of a vehicle is detected; a status determination section that makes a determination that the driver is in a driving difficulty state, when the abnormality of the driver is detected continuously; and an evacuation control section that initiates an automatic evacuation control when the status determination section makes the determination that the driver is in the driving difficulty state, the automatic evacuation control stopping automatically the vehicle. The travel control apparatus further includes an assistance control section that initiates a driving assistance control during an interval from when the abnormality is detected to when the driving difficulty state is determined; the driving assistance control includes at least activating a lane departure prevention function of the vehicle.

According to another aspect of the present disclosure, a travel control method is provided to be executed by at least one processor to initiate an automatic evacuation control stopping automatically a vehicle when a driver of the vehicle is in a driving difficulty state is provided. The method includes: an abnormality information acquiring that acquires information indicating that an abnormality of the driver is detected; a status determining that makes a determination that the driver is in the driving difficulty state, when the abnormality of the driver is detected continuously; an evacuation controlling that initiates the automatic evacuation control when the status determining makes the determination that the driver is in the driving difficulty state; and an assistance controlling that initiates a driving assistance control during an interval from when the abnormality is detected to when the driving difficulty state is determined, the driving assistance control including at least activating a lane departure prevention function of the vehicle.

According to the above aspects of the present disclosure, the vehicle can steadily travel as driving assistance control is exercised to prevent the deviation of the vehicle from a traveling lane even during the interval between the detection of driver abnormality and the determination of driving difficulty. Consequently, when the driver is having difficulty in driving the vehicle, the travel control apparatus can properly switch to automatic evacuation control for automatically stopping the vehicle at a place where the vehicle may stop.

BRIEF DESCRIPTION OF DRAWINGS

The above and other objects, features and advantages of the present disclosure will become more apparent from the following detailed description made with reference to the accompanying drawings. In the drawings.

EMBODIMENTS

Figure 1:
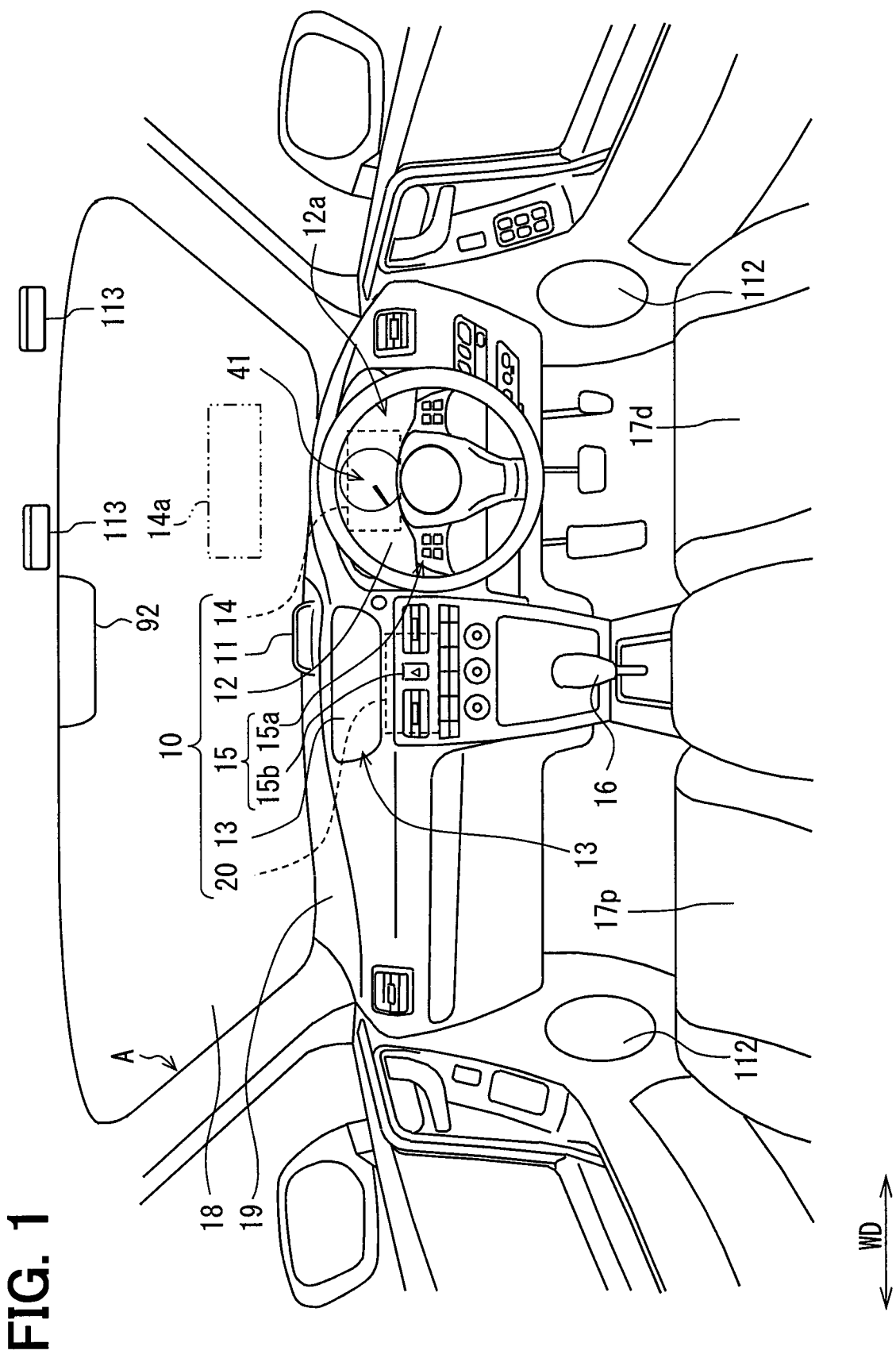
FIG. 1 is a diagram illustrating a layout around a driver seat in a host vehicle.

Embodiments of the present disclosure will now be described with reference to the accompanying drawings. Identical elements in different embodiments may be designated by the same reference numerals and may not be redundantly described. When only some of the elements in a particular embodiment are described, the remaining elements may be regarded as identical with corresponding elements in an earlier-described different embodiment. Further, although certain combinations of elements are expressly described in conjunction with each embodiment, some of the elements in two or more embodiments may be combined as far as no issue is raised even if such a combination is not expressly described. Moreover, combinations of elements described in conjunction with two or more embodiments and modifications are regarded as being disclosed by the subsequent description even if such combinations are not expressly described.

First Embodiment

As in FIGS. 1 and 2A to 2D, a vehicle control ECU 70 according to a first embodiment of the present disclosure is an electronic apparatus mounted in a vehicle A. The vehicle A is referred to also as a subject vehicle. The vehicle control ECU 70 is one of a plurality of nodes in an in-vehicle network 1 mounted in the vehicle A. The in-vehicle network 1 includes an ADAS locator 96, an in-vehicle communicator 97, a headlight control apparatus 95, an outside recognition system 90, an HMI system 10, and a vehicle control system 60. These elements are connected to a communication bus 99 and capable of establishing communication to exchange information with each other. The word "information" is used not only as an uncountable noun but also as a countable noun. A plurality of informations are equivalent to a plurality of items of information.

The ADAS (Advanced Driver Assistance Systems) locator 96 includes a GNSS (Global Navigation Satellite System) receiver, a gyro sensor or other inertial sensor, and a memory for storing map data. The ADAS locator 96 measures the position of the vehicle A by combining a measurement result produced by the inertial sensor with a signal that is transmitted from a plurality of human-made satellites and received by the GNSS receiver. The ADAS locator 96 accesses the memory, reads map data about an area ahead of a host vehicle, and extracts road information such as a maximum speed limit, a minimum speed limit, the curvature radius of a curve, a rotation angle, and a start position as well as lane information such as the number of lanes and positions of the lanes, positions of strips or shoulders. The ADAS locator 96 outputs, to the communication bus 99, the position information about the vehicle A and the road information about an area ahead of the vehicle A.

The in-vehicle communicator 97 is a V2X wireless communicator. The in-vehicle communicator 97 is connected to an antenna 98 for wireless communication. The in-vehicle communicator 97 can wirelessly establish vehicle-to-vehicle communication with an in-vehicle communicator in a different vehicle A1 positioned in the vicinity of the vehicle A (see FIG. 6). Additionally, the in-vehicle communicator 97 can establish mobile communication with a base station outside the vehicle A. The in-vehicle communicator 97 can transmit information about the vehicle A, which is outputted to the communication bus 99, for example, to the different vehicle A1 and a call center. The in-vehicle communicator 97 can receive information, for example, from the different vehicle A1 and from the call center and output the received information to the communication bus 99. The vehicle A and the different vehicle A1, in which the in-vehicle communicator is mounted, are each referred to also as an equipped vehicle or a host vehicle in relation to the in-vehicle communicator.

The headlight control apparatus 95 is mainly formed of a microcomputer having a processor and a memory. The headlight control apparatus 95 is connected to a plurality of lights mounted on the vehicle A, such as dipped-beam headlights (low-beam headlights), main-beam headlights (high-beam headlights) 95a, direction indicators, and hazard lamps. Based on lighting request information from the communication bus 99, the headlight control apparatus 95 controls the operation of each light.

The outside recognition system 90 includes a surroundings monitoring ECU 91 and outside sensors, such as a front camera unit 92 and radar units 93, 94. The outside recognition system 90 detects movable objects (such as pedestrians, animals, bicycles, motorcycles, and different vehicles) and stationary objects (such as fallen objects on roads, traffic lights, guard rails, curbs, road signs, road markings, line markings, and trees). The outside recognition system 90 may include an outside sensor, such as a LIDAR sensor or a sonar, in addition to the units 92-94.

The front camera unit 92 is, for example, a monocular camera or a compound-eye camera that is mounted near a rear-view mirror of the vehicle A. The front camera unit 92 is oriented in the traveling direction of the vehicle A and capable of capturing an image, for example, of a range approximately 80 meters from the vehicle A at a horizontal viewing angle of approximately 45 degrees. The front camera unit 92 successively outputs, to the surroundings monitoring ECU 91, data about a captured image 154 (see FIG. 14A) showing, for example, movable objects, stationary objects, and a road in the traveling direction.

The radar unit 93 is mounted, for example, on a front portion of the vehicle A. The radar unit 93 uses a transmission antenna to emit a 77-GHz band millimeter wave in the traveling direction of the vehicle A. The radar unit 93 uses a reception antenna to receive a millimeter wave that is reflected, for example, from movable or stationary objects in the traveling direction. The radar unit 93 is capable of scanning a range, for example, of approximately 60 meters from the vehicle A at a horizontal scanning angle of approximately 55 degrees. The radar unit 93 successively outputs a scanning result based on a received signal to the surroundings monitoring ECU 91.

The radar unit 94 is mounted, for example, on each of the left and right sides of front and rear portions of the vehicle A. The radar unit 94 uses a transmission antenna to emit a 24-GHz submillimeter wave in the lateral directions from the front and rear portions of the vehicle A. The radar unit 94 uses a reception antenna to receive a submillimeter wave that is reflected, for example, from movable or stationary objects in the front and rear lateral directions. The radar unit 94 is capable of scanning a range, for example, of approximately 30 meters from the vehicle A at a horizontal scanning angle of approximately 120 degrees. The radar unit 94 successively outputs a scanning result based on a received signal to the surroundings monitoring ECU 91.

The surroundings monitoring ECU 91 is mainly formed of a microcomputer having a processor and a memory. The surroundings monitoring ECU 91 is communicatively connected to the front camera unit 92 and the radar units 93, 94. The surroundings monitoring ECU 91 integrates information acquired from the units 92, 93 in order to detect, for example, the relative positions of movable objects and stationary objects in the traveling direction (hereinafter referred to as "detected objects"). Additionally, the surroundings monitoring ECU 91 uses information acquired from the radar unit 94 in order to detect, for example, the relative positions of detected objects in the front and rear lateral directions.

The surroundings monitoring ECU 91 outputs monitoring information to the communication bus 99. The monitoring information outputted from the surroundings monitoring ECU 91 includes relative position information about preceding or parallel traveling vehicles in the vicinity of the vehicle A and shape information about line markings in the traveling direction of the vehicle A. Based on the detection of the different vehicle A1 traveling in an adjacent lane (see FIG. 6), the surroundings monitoring ECU 91 determines whether the vehicle A may change to the adjacent lane, and outputs the result of determination to the communication bus 99 as the monitoring information. Upon acquiring search request information from the communication bus 99, the surroundings monitoring ECU 91 uses position information and road information acquired from the ADAS locator 96 and information acquired from the units 92, 93 in order to search for an evacuation spot where the vehicle A is to be stopped under later-described automatic evacuation control. The surroundings monitoring ECU 91 outputs, to the communication bus 99, position information about the evacuation spot that is set according to the result of search. Further, the surroundings monitoring ECU 91 outputs, to the communication bus 99, image data about the captured image 154 (see FIG. 14A) that is captured by the front camera unit 92.

The HMI system 10 includes a plurality of display devices, such as a combination meter 12, a CID 13, and an HUD apparatus 14. Additionally, the HMI system 10 includes acoustic devices for voice information notification, such as audio speakers 112 and ultrasonic speakers 113. Further, the HMI system 10 includes a plurality of manipulating devices 15, a DSM (Driver Status Monitor) 11, and an HCU (HMI (Human Machine Interface) Control Unit) 20. The HMI system 10 presents information to the driver of the vehicle A, who is seated in a driver seat 17d, and to other occupants of the vehicle A.

The combination meter 12 is disposed in front of the driver seat 17d in the interior of the vehicle A. The combination meter 12 includes a liquid crystal display. The liquid crystal display has a display screen 12a that is viewable by the driver seated in the driver seat 17d. Based on image data acquired from the HCU 20, the combination meter 12 displays an image, for example, of a speedometer 41 on the display screen 12a of the liquid crystal display.

The CID (Center Information Display) 13 is disposed above a center cluster in the interior of the vehicle A and incorporated in an instrument panel 19. The CID 13 includes a liquid crystal display. The liquid crystal display has a display screen 13a that is viewable not only by the driver but also by the other occupants, such as an occupant seated in a front passenger seat 17p. The display screen 13a is longitudinally shaped and long in the width direction WD of the vehicle A in which the driver seat 17d and the front passenger seat 17p are arranged. Based on image data acquired from the HCU 20, the CID 13 causes the liquid crystal display to display, for example, a navigation guidance screen, an air-conditioner manipulating screen, and an audio instrument manipulating screen.

The HUD (Head-Up Display) apparatus 14 projects image light based on image data acquired from the HCU 20 onto a predefined projection area 14a of a windshield 18. Image light reflected from the windshield 18 to the interior of the vehicle is perceived by the driver seated in the driver seat 17d. The driver can view the virtual image of an image projected by the HUD apparatus 14 in combination with an external scene ahead of the vehicle A.

The audio speakers 112 are disposed in a door lining for the vehicle A and positioned laterally to the driver seat 17d and the front passenger seat 17p. The audio speakers 112 reproduce audio audible to all occupants of the vehicle A. The audio speakers 112 are capable of conveying information to all the occupants by using the reproduced audio.

A pair of ultrasonic speakers 113 is disposed in front of the driver seat 17d in the interior of the vehicle A and above the windshield 18. The ultrasonic speakers 113 emit a highly directional ultrasonic wave toward a headrest of the driver seat 17d. The ultrasonic speakers 113 generate an audible sound by using distortion applied to an ultrasonic wave propagating in air. The ultrasonic speakers 113 reproduce a voice that is audible only to the driver seated in the driver seat 17d and not audible to the other occupants of the vehicle A. The ultrasonic speakers 113 can convey information only to the driver by using the reproduced voice. The positions at which the ultrasonic speakers 113 are disposed may be changed as appropriate as far as ultrasonic waves can be directly emitted toward the headrest of the driver seat 17d. The ultrasonic speakers 113 may be disposed, for example, at the base of a pillar lateral to the windshield 18.

The manipulating devices 15 include a steering switch 15a and a hazard switch 15b. The steering switch 15a is disposed on a spoke portion of a steering wheel of the vehicle A. The driver manipulates the steering switch 15a in order to input a setup signal, for example, for the HMI system 10 and the vehicle control system 60. The hazard switch 15b is disposed on the center cluster in the interior of the vehicle. The driver or other occupant of the vehicle manipulates the hazard switch 15b in order to input a signal for intermittently illuminating the hazard lamps of the vehicle A. The steering switch 15a and the hazard switch 15b output a manipulating signal based on their manipulation to the HCU 20.

The DSM 11 includes a near-infrared light source, a near-infrared camera, and a control unit for controlling them. The DSM 11 is disposed on the upper surface of the instrument panel 19 with the near-infrared camera facing the driver seat 17d. The DSM 11 uses the near-infrared camera to capture an image of the face of the driver that is irradiated with near-infrared light emitted from the near-infrared light source. The image captured by the near-infrared camera is analyzed by the control unit. The control unit extracts, from the captured image, for example, the orientation of the face of the driver and the degree of opening of the eyes of the driver. If the analysis made by the control unit detects a state where, for example, the driver is not facing forward or the driver's eyes are closed, the DSM 11 outputs a detection signal indicative of driver abnormality to the HCU 20.

The HCU 20 includes a control circuit 20a, which includes a main processor 21, a drawing processor 22, a rewritable nonvolatile memory 23, an input/output interface 24 for inputting and outputting information, and a bus for connecting them. The HCU 20 is connected, for example, to the display devices, the acoustic devices, the manipulating devices 15, and the DSM 11. The HCU 20 acquires manipulating signals outputted from the steering switch 15a and the hazard switch 15b and a detection signal outputted from the DSM 11. The HCU 20 controls the display of the display devices by outputting control signals and image data to the display devices. The HCU 20 causes the acoustic devices to reproduce a voice by outputting voice data to the acoustic devices.

The vehicle control system 60 includes manipulation detection sensors, such as an accelerator position sensor 61, a brake pedal pressure sensor 62, and a steering torque sensor 63, and a vehicle speed sensor 64 for detecting the traveling state of the vehicle A. Additionally, the vehicle control system 60 includes a vehicle control ECU 70 and travel control devices, such as an electronically-controlled throttle 66, a brake actuator 67, and an EPS motor 68. The vehicle control system 60 controls the travel of the vehicle A based, for example, on driving manipulations by the driver, monitoring information acquired by the outside recognition system 90, and position information and road information acquired by the ADAS locator 96.

The accelerator position sensor 61 detects the amount of accelerator pedal depression by the driver and outputs the detected amount to the vehicle control ECU 70. The brake pedal pressure sensor 62 detects a pressure applied to a brake pedal by the driver and outputs the detected pressure to the vehicle control ECU 70. The steering torque sensor 63 detects a steering torque applied to the steering wheel by the driver and outputs the detected steering torque to the vehicle control ECU 70. The vehicle speed sensor 64 detects the current traveling speed of the vehicle A and outputs the detected traveling speed to the vehicle control ECU 70.

The electronically-controlled throttle 66 controls its opening based on a control signal outputted from the vehicle control ECU 70. The brake actuator 67 generates a brake pressure based on a control signal outputted from the vehicle control ECU 70 in order to control braking force applied to each tire wheel. Based on a control signal outputted from the vehicle control ECU 70, the EPS (Electric Power Steering) motor 68 controls steering force and steering retention force applied to a steering mechanism.

The vehicle control ECU (Electronic Control Unit) 70 includes at least an integrated control ECU and may additionally include either or both of a power unit control ECU and a brake control ECU. The vehicle control ECU 70 includes a control circuit 70a, which includes a main processor 71, a rewritable nonvolatile memory 73, an input/output interface 74 for inputting and outputting information, and a bus for connecting them.

The vehicle control ECU 70 is connected to the sensors 61-64 and the travel control devices. The vehicle control ECU 70 acquires detection signals outputted from the sensors 61-64 and outputs control signals to the travel control devices. Additionally, the vehicle control ECU 70 outputs the detection signals of the sensors 61-64 to the communication bus 99 as vehicle information.

The vehicle control ECU 70 has a plurality of driving assistance functions for providing assistance to the driver's driving manipulations or performing the driving manipulations instead of the driver by controlling, for example, the driving force, braking force, and steering force of the vehicle A. The driving assistance functions include a cruise control function and a lane departure prevention function. The vehicle control ECU 70 activates the driving assistance functions based on a driver's input to the steering switch 15a. For the sake of convenience, the subsequent description assumes that the cruise control function is referred to as ACC (Adaptive Cruise Control), and that the lane departure prevention function is referred to as LKA (Lane Keeping Assist).

When the ACC is activated, the vehicle control ECU 70 controls the traveling speed of the vehicle A by adjusting the driving force and braking force based on the monitoring information about a preceding vehicle, which is acquired from the surroundings monitoring ECU 91. If no preceding vehicle is detected, the ACC allows the vehicle A to travel at a constant speed, that is, at a target speed selected by the driver. By contrast, if a preceding vehicle is detected, the ACC allows the vehicle A to follow the preceding vehicle while maintaining a certain inter-vehicle distance to the preceding vehicle.

When the LKA is activated, the vehicle control ECU 70 controls the steering force and the steering retention force based on shape information about line markings in the traveling direction, which is acquired from the surroundings monitoring ECU 91. The LKA causes the vehicle A to keep traveling in a lane by applying such a steering force as to prevent the vehicle A from approaching the line markings. The road information outputted from the ADAS locator 96 may be used for vehicle control exercised by the ACC and the LKA.

The vehicle control ECU 70 is capable of exercising automatic evacuation control in addition to travel control based on the above-described driving assistance functions. Automatic evacuation control is exercised to automatically stop the vehicle A when the driver has difficulty in driving the vehicle A (hereinafter referred to as a "driving difficulty state"). When automatic evacuation control is initiated, the vehicle control ECU 70 causes the surroundings monitoring ECU 91 to search for an evacuation spot where the vehicle A is to be stopped. The vehicle control ECU 70 moves the vehicle A to the evacuation spot set according to the result of search by the surroundings monitoring ECU 91, and stops the vehicle A at the evacuation spot.

Further, before initiating automatic evacuation control, the vehicle control ECU 70 can exercise pre-evacuation control for providing driving assistance to the driver by automatically activating the driving assistance functions. In order to implement such control, the control circuit 70a of the vehicle control ECU 70 builds a plurality of functional blocks (80-89) by allowing the processor 71 to execute a program stored in the memory 73. The functional blocks related to automatic evacuation control and pre-evacuation control will be described in detail below based on FIG. 3 while referring to FIGS. 1 and 2A to 2D.

An abnormality information acquisition section 81, which is referred to also as the abnormality information acquirer 81, acquires information detected by the DSM 11 through the HCU 20 and the communication bus 99. If driver abnormality is continuously detected, the abnormality information acquisition section 81 continuously acquires the detected information from the DSM 11.

A response determination section 86, which is referred to also as the response determiner 86, determines, based on a driver status detected by the DSM 11, whether the driver has responded to a notification generated, for example, by an abnormality notification section 84.

A manipulation reception section 88, which is referred to also as the manipulation receiver 88, is capable of receiving a driving manipulation by the driver based on manipulating signals outputted from the sensors 61-63. During the interval between the initiation of pre-evacuation control and the initiation of automatic evacuation control, the manipulation reception section 88 receives a driving manipulation by the driver. After the start of automatic evacuation control, however, the manipulation reception section 88 prohibits the reception of a driving manipulation by the driver. Upon detecting an input from an occupant to the hazard switch 15b, the manipulation reception section 88 permits the reception of a driving manipulation.

A status determination section 80, which is referred to also as the status determiner 80, is capable of tentatively or formally determining that the driver is in an abnormal state and determining that the driver is in the driving difficulty state. A tentative determination of an abnormal state is made before a formal determination. The tentative determination of an abnormal state is made when an abnormality is continuously detected by the DSM 11 for a first threshold period of time TH1 (see FIG. 4). The first threshold period of time TH1 is set based on the abnormality detection resolution of the DSM 11. If, for example, the detection cycle of the DSM 11 is repeated at 0.1-second intervals, the status determination section 80 makes a tentative determination when an abnormality is successively detected multiple times (e.g., approximately 3 to 5 times). In such an instance, the first threshold period of time TH1 is 0.3 to 0.5 seconds. When the first threshold period of time TH1 is set in the above manner, the DSM 11 can be prevented from erroneously detecting an abnormal state.

The formal determination of a driver in an abnormal state is made based on continuous detection of driver abnormality during the interval between the tentative determination of the abnormal state and the determination of the driving difficulty state. The formal determination of the abnormal state is made when the abnormality is continuously detected by the DSM 11 for a second threshold period of time TH2 (e.g., 2.0 seconds; see FIG. 4). The second threshold period of time TH2 is set to be longer than a general upper limit time (approximately 1.6 seconds) for a driver engaged in inattentive driving. Setting the second threshold period of time TH2 as described above avoids a situation where inattentive driving is erroneously determined to be the abnormal state.

When a driver abnormality acquired by the abnormality information acquisition section 81 is still continuously detected, the driver is determined to be in the driving difficulty state. More specifically, if no responsive manipulation is performed by the driver during the interval between the formal determination of an abnormal state and the end of a preset response time AT (3 to 8 seconds; see FIG. 4), the status determination section 80 determines that the driver is in the driving difficulty state.

The response time AT is set to be sufficiently long so that a responsive manipulation can be performed by the driver who has recognized an abnormality detection notification from the HMI system 10. The responsive manipulation is performed, for example, by depressing the steering switch 15a. Even if a confirmation manipulation is performed during the response time AT to confirm the driving difficulty state, a determination is made that the driver is in the driving difficulty state. The confirmation manipulation is performed, for example, by depressing a steering switch 15a that is different from the steering switch 15a for the responsive manipulation.

An evacuation control section 82, which is referred to also as the evacuation controller 82, initiates automatic driving control based on a determination made by the status determination section 80 that the driver is in the driving difficulty state. The evacuation control section 82 exercises integrated control over the travel control devices, such as the electronically-controlled throttle 66, the brake actuator 67, and the EPS motor 68, in order to move the vehicle A along a planned travel path to an evacuation spot set by the surroundings monitoring ECU 91. The evacuation control section 82 then stops the vehicle A at the evacuation spot.

An assistance control section 83, which is referred to also as the assistance controller 83, initiates control (driving assistance control) by exercising the driving assistance functions including at least the LKA during the interval between the detection of abnormality and the determination of the driving difficulty state. After the detection of driver abnormality, the assistance control section 83 activates the LKA prior to the other assistance functions exercisable during driving assistance control.

More specifically, the assistance control section 83 activates the LKA based on a tentative determination that is made before the formal determination of an abnormal state. Based on the formal determination of the abnormal state, the assistance control section 83 activates the ACC as an assistance function different from the LKA. The assistance control section 83 stops exercising driving assistance control if the manipulation reception section 88 receives a driving manipulation after the initiation of driving assistance control.

The abnormality notification section 84 (referred to also as the abnormality notifier 84) and a switching notification section 85 (referred to also as the switching notifier 85) output notification request information to the HCU 20 in order to control the display devices and acoustic devices in the HMI system 10. When driving assistance control is initiated based on the tentative determination of an abnormal state, the abnormality notification section 84 uses a display device to convey the description of an abnormality detected by the DSM 11 (e.g., postural distortion) to the driver. Based on the formal determination of the abnormal state, the switching notification section 85 uses the display devices and the acoustic devices to give the driver an advance notice of switching to automatic evacuation control.

A search control section 87, which is referred to also as the search controller 87, outputs search request information to the surroundings monitoring ECU 91 in order to let the surroundings monitoring ECU 91 search for an evacuation spot where the vehicle A is to be stopped during automatic evacuation control. The search control section 87 is capable of letting the surroundings monitoring ECU 91 search for an evacuation spot during the interval between the detection of driver abnormality and the determination of a driving difficulty state by the status determination section 80. More specifically, the surroundings monitoring ECU 91 begins to search for an evacuation spot based on the formal determination of an abnormal state.

A vehicle exterior notification section 89 is referred to also as the vehicle exterior notifier 89. When the status determination section 80 determines that the driver is in the driving difficulty state, the vehicle exterior notification section 89 initiates a process for issuing a warning to the different vehicle A1 (see FIG. 6) traveling in the vicinity of the vehicle A. The vehicle exterior notification section 89 outputs transmission request information to the in-vehicle communicator 97 in order to transmit, to the different vehicle A1, information indicative that the driver of the vehicle A is in the driving difficulty state. The vehicle exterior notification section 89 outputs the lighting request information to the headlight control apparatus 95 in order to intermittently illuminate the hazard lamps of the vehicle A and illuminate the main-beam headlights 95a. The above-described process notifies the driver and other occupants of the different vehicle A1 that the driver of the vehicle A is in the driving difficulty state.

The following describes a plurality of processes that are performed by the vehicle control system 60 having the above configuration in order to automatically steer and stop the vehicle A whose driver is in the driving difficulty state. First of all, operations for pre-evacuation control (T1-T6), which are performed before the initiation of automatic evacuation control, will be sequentially described based on the timing diagrams of FIGS. 4 and 5 while referring to FIGS. 2A to 2D.

When the driver becomes unconscious (T1), the driver subsequently suffers from postural distortion (T2). Postural distortion can be immediately detected by the DSM 11. If postural distortion persists for the first threshold period of time TH1, the vehicle control ECU 70 tentatively determines that the driver is an abnormal state (T3). Based on such a tentative determination, the LKA is activated for first pre-evacuation control. The notification request information outputted from the vehicle control ECU 70 to the HCU 20 causes the HMI system 10 to generate a first notification based on the tentative determination.

If postural distortion persists for a second threshold period of time TH2, the vehicle control ECU 70 formally determines that the driver is in an abnormal state (T4). Based on such a formal determination, the ACC is activated together with the LKA for second pre-evacuation control. Further, the surroundings monitoring ECU 91 begins to search for an evacuation spot. The notification request information outputted from the vehicle control ECU 70 to the HCU 20 causes the HMI system 10 to generate a second notification.

The second notification is generated to ask the driver to select either execution or no execution of the automatic evacuation control. In response to the second notification, the driver in a normal state may manipulate a steering switch 15a that corresponds to "YES." This responsive manipulation cancels switching to automatic evacuation control. Meanwhile, the driver in a moderate driving difficulty state may manipulate a steering switch 15a that corresponds to "NO." This confirmation manipulation forcibly switches to automatic evacuation control without waiting for the lapse of the response time AT.

Before the response time AT elapses after formal determination, the vehicle control ECU 70 initiates a braking control to place the vehicle A in a moderate deceleration state (T5). In this vehicle deceleration control, if the vehicle A rapidly decelerates to a speed that is too low, a possibility that the vehicle A is rear-ended by a following vehicle is created. In view of this, the vehicle deceleration control may cause the vehicle A to moderately decelerate toward a target speed that is larger than the minimum speed limit of the road (e.g., freeway) that the vehicle A is traveling. The target speed may be 60 km/h in some cases. In this regard, the target speed should be less than or equal to the maximum speed limit of the traveling road. A difference between the target speed and the minimum speed limit may be predetermined in consideration of, for example, an average speed of the vehicles of the road, based on traffic history data of that road and the like. For performing such vehicle deceleration control T5, the vehicle control ECU 70 may use the ACC and may automatically set the target speed of the ACC between the minimum and maximum speed limits of the traveling road. Alternatively, the vehicle control ECU 70 may use a dedicated vehicle deceleration control prepared for the pre-evacuation control. The vehicle control ECU 70 may acquire the minimum and maximum speed limits of the traveling road from the map data or the like. Based on the lapse of the response time AT, the vehicle control ECU 70 conclusively determines that the driver is in the driving difficulty state (T6). Based on the conclusive determination of the driving difficulty state, the vehicle control ECU 70 switches a control mode for the vehicle A from pre-evacuation control to automatic evacuation control.

Figure 6:
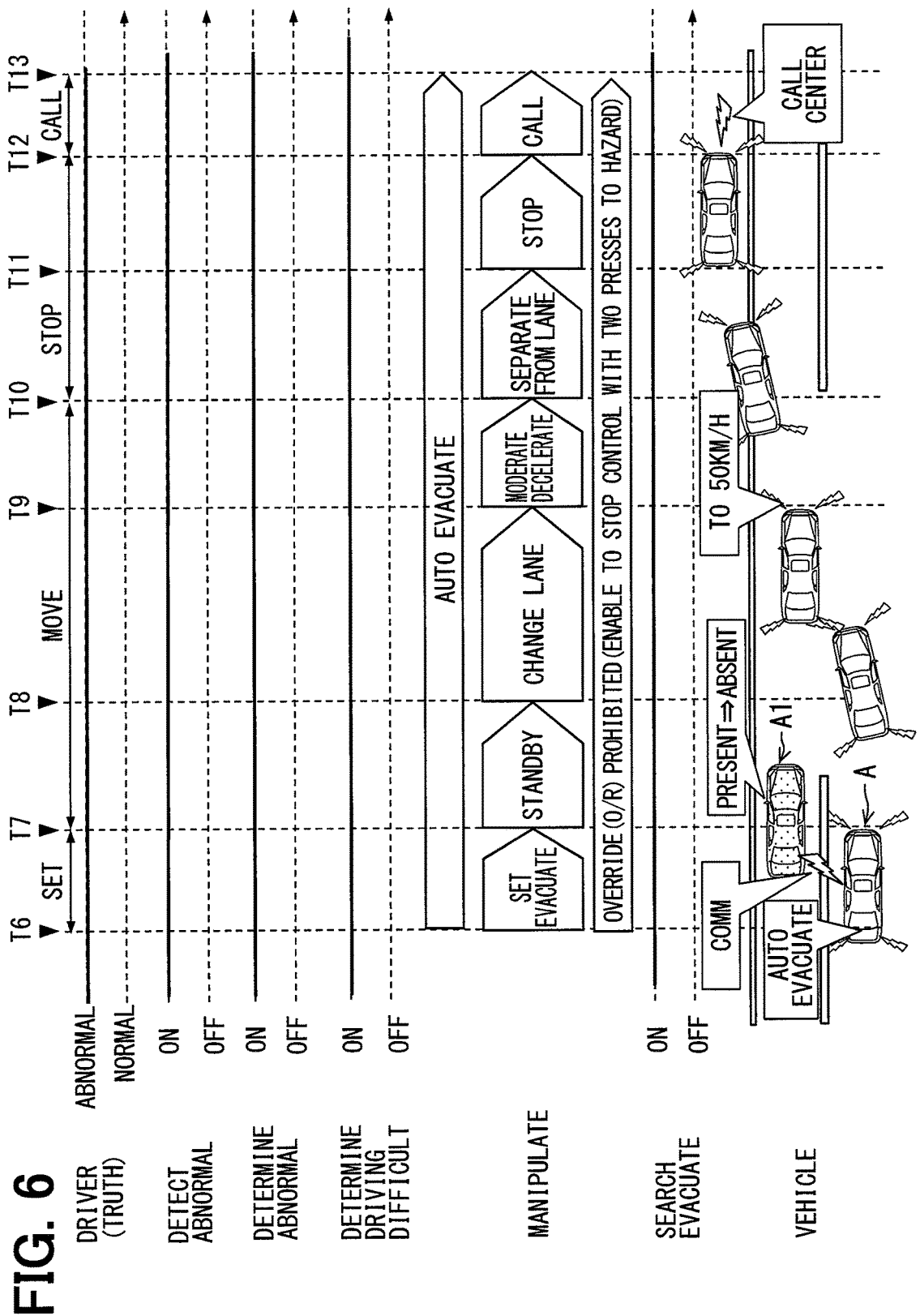
FIG. 6 is a timing diagram illustrating a process that is performed during the interval between the start of automatic evacuation control and the issuance of an emergency notification.
Figure 7:
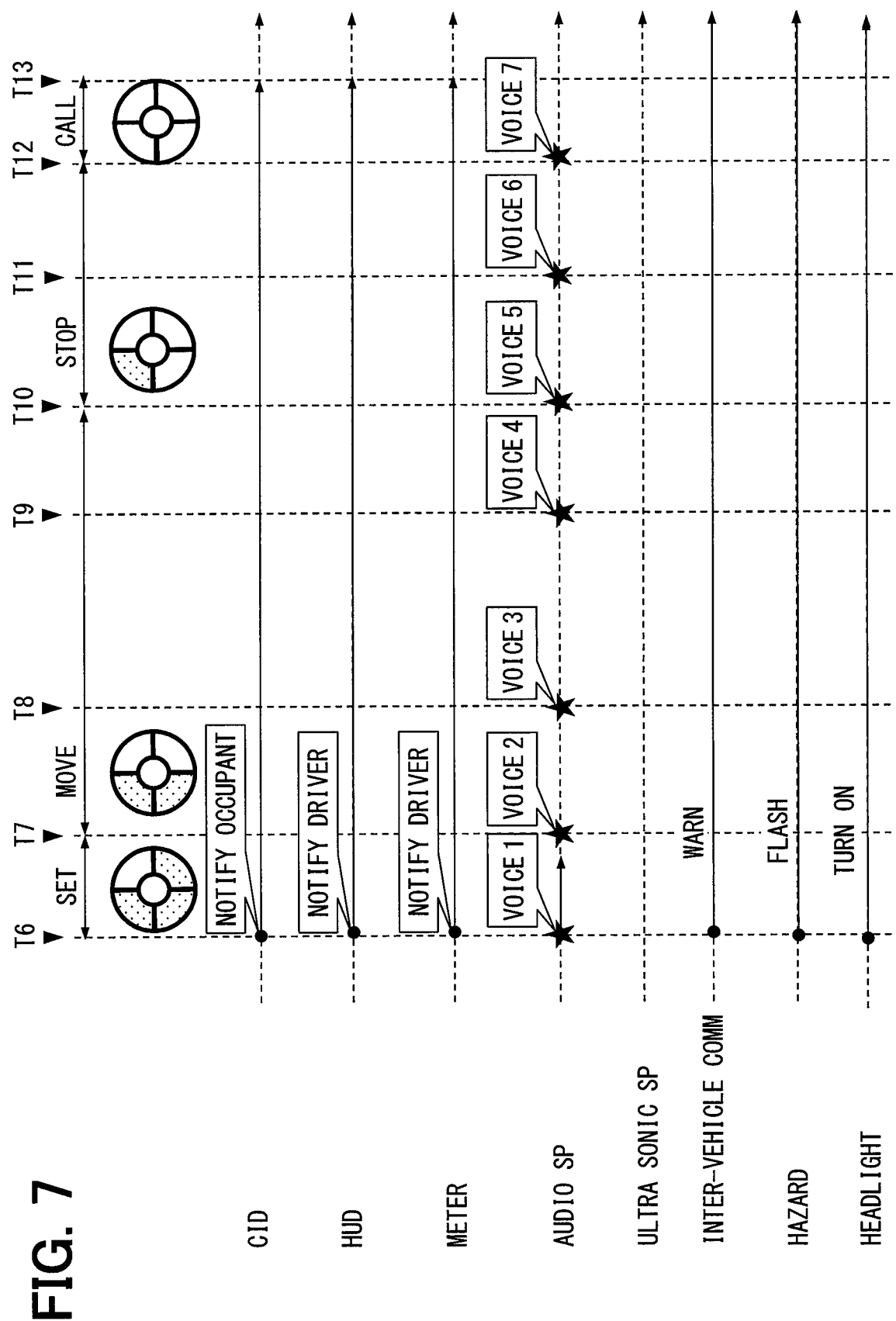
FIG. 7 is a timing diagram illustrating a process that is performed during the interval between the start of automatic evacuation control and the issuance of the emergency notification.

A series of processes performed after the start of automatic evacuation control (T6-T13) in order to automatically drive the vehicle A until it moves to an evacuation spot will now be sequentially described based on the timing diagrams of FIGS. 6 and 7 while referring to FIGS. 2A to 2D.

When automatic evacuation control starts (T6), the vehicle control ECU 70 initiates a setup process. The setup process is performed to set an evacuation spot where the vehicle A is to be stopped and set a planned travel path to the evacuation spot. The vehicle control ECU 70 may set the evacuation spot and the planned travel path or acquire at least either one of the evacuation spot and planned travel path set by the surroundings monitoring ECU 91. The setup process is performed based on the conclusive determination of the driving difficulty state in order to report the driving difficulty state to a different vehicle A1 traveling in the vicinity of the vehicle A. More specifically, the setup process is performed to establish vehicle-to-vehicle communication based on the transmission request information to the in-vehicle communicator 97 in order, for example, to distribute a warning, intermittently illuminate the hazard lamps, and illuminate the main-beam headlights 95a. Further, based on the notification request information outputted from the vehicle control ECU 70 to the HCU 20, the HMI system 10 issues an execution notification indicative of the execution of automatic evacuation control.

Upon completion of setup of the evacuation spot and movement path (T7), the vehicle control ECU 70 switches to a movement process under automatic evacuation control. The movement process is performed to move the vehicle A along the planned travel path. If necessary, the vehicle A is moved to an adjacent lane in the movement process. If a different vehicle A1 is traveling in a lane to which the vehicle A is about to move, the vehicle A is placed in standby for a lane change depending on the result of determination whether the lane change can be made. In the standby for lane change, the vehicle control ECU 70 causes a warning to be issued to a surrounding vehicle, by causing (i) the hazard lamps of the vehicle A to blink (intermittently illuminating) and (ii) a horn of the vehicle A to sound. When it is determined later that the lane change can be made, the vehicle A starts moving to the adjacent lane (T8). Specifically, the lane change in a direction to approach a road strip or a road shoulder is initiated. For making the lane change, the vehicle control ECU 70 may acquire the positional information of the vehicle A and acquire, from the map data or the like, the lane information on the lanes and the strip or the shoulder of the road that the vehicle A is traveling or scheduled to travel according to the movement path. In the lane change, the vehicle control ECU 70 causes the blinking of the hazard lamps to be stopped and further causes (i) the waring to be issued by the horn and (ii) the direction indicator to blink to indicate the lane change. The vehicle control ECU 70 may cause the vehicle A to make the lane change a plurality of times in order to move the vehicle A into a lane that is adjacent to the road strip or the road shoulder. Upon completion of the lane change to the lane adjacent to the road strip or the road shoulder, the vehicle control ECU 70 moderately decelerates the vehicle A to a speed at which the vehicle A can easily be stopped (T9). In this vehicle deceleration control, the vehicle control ECU 70 causes (i) the blinking of the direction indicator to be stopped and (ii) the hazard lamps of the vehicle A to blink. In this vehicle deceleration control also, the ACC may be used.

When the traveling speed of the vehicle A decreases to a predetermined speed (e.g., 50 km/h) (T10), the vehicle control ECU 70 switches to a stop process under automatic evacuation control. In the stop process, the vehicle control ECU 70 causes the vehicle A to separate from the traveling lane. When the vehicle A is evacuated to the side of a road (road shoulder) or to a side strip (road strip), the vehicle control ECU 70 applies a braking force to the vehicle A and stops the vehicle A at the selected evacuation spot (T11).

When the vehicle A is stopped at the evacuation spot, the vehicle control ECU 70 switches to a call process under automatic evacuation control (T12). The call process is performed to contact a preselected call center. Upon completion of contacting the call center, the vehicle control ECU 70 terminates the automatic evacuation control (T13).

Figure 8:
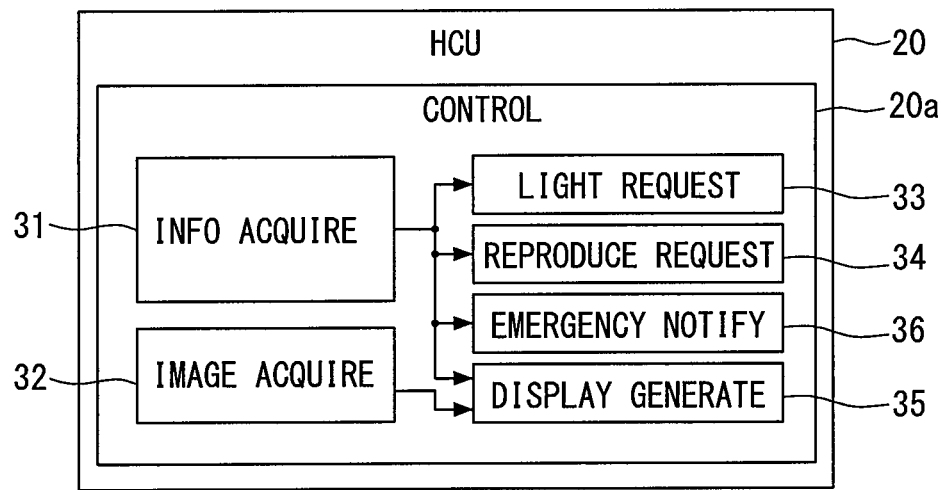
FIG. 8 is a diagram illustrating functional blocks built in a control circuit of an HCU.

Under pre-evacuation control and automatic evacuation control, which have been described above, the HMI system 10 presents information to the driver and the other occupants of the vehicle by generating the first notification, the second notification, and the execution notification. Particularly, the execution notification is issued from the HMI system 10 to the occupants of the vehicle A in order to report switching from the setup process to the movement process, switching from the movement process to the stop process, or switching from the stop process to the call process. In order to present such information, the control circuit 20a of the HCU 20 in FIG. 2B builds a plurality of functional blocks (31-36) by letting the processors 21, 22 execute programs stored in the memory 23. These functional blocks will be described in detail below based on FIG. 8 while referring to FIGS. 1 and 2A to 2D.

An information acquisition section 31 acquires various information outputted to the communication bus 99. More specifically, the information acquisition section 31 acquires, for example, the vehicle information such as the traveling speed outputted from the vehicle control ECU 70 to the communication bus 99, the notification request information indicative of the execution of various notifications, and the information about operations for driving assistance and automatic evacuation control. The information about the operations for driving assistance includes information indicative of whether the ACC and the LKA are activated. The information about the operations for automatic evacuation control includes information indicative of a currently performed process, which is one of a plurality of processes performed under automatic evacuation control, and information indicative of the evacuation spot and the planned travel path.

An image acquisition section 32 acquires data about the captured image 154 (see FIG. 14) outputted from the surroundings monitoring ECU 91 to the communication bus 99. The captured image 154 is a camera image in the traveling direction and captured by the front camera unit 92. The captured image 154 includes the planned travel path that is set under automatic evacuation control.

As is the case with the vehicle exterior notification section 89 (see FIG. 3), a lighting request section 33 outputs the lighting request information to the headlight control apparatus 95 in order to control the operation of the main-beam headlights 95a. Upon acquiring the information about the operations for automatic evacuation control, the lighting request section 33 causes the headlight control apparatus 95 to start illuminating the main-beam headlights 95a. This makes the planned travel path visible even at night, in a tunnel, or in any other situation where natural light is limited. Additionally, the planned travel path is clearly shown in the captured image 154 (see FIG. 14).

A reproduction request section 34 outputs voice data to the audio speakers 112 and ultrasonic speakers 113 in order to let the speakers 112, 113 reproduce a voice. When the process performed under automatic evacuation control is changed, the reproduction request section 34 reproduces a voice audible to all occupants in order to give them the description of a new process.

A display generation section 35 generates a display screen 12*a* of the combination meter 12, a display screen 13*a* of the CID 13, and a projection area 14*a* of the HUD apparatus 14. When pre-evacuation control is being exercised, the display generation section 35 generates the display screens for the first and second notifications (see FIGS. 9 to 13). When automatic evacuation control is being exercised, the display generation section 35 generates occupant notification on-screen information 150 (see FIG. 14) to be displayed on the display screen 13*a* and driver notification on-screen informations 140, 146 (see FIGS. 15 and 16) to be displayed on the display screen 12*a* and the projection area 14*a*, respectively.

An emergency notification section 36 places an emergency call to a preselected call center after the vehicle A is moved to and stopped at the evacuation spot under automatic evacuation control. The emergency notification section 36 is capable of acquiring information about the vehicle A, such as the current position of the vehicle A, and transmitting the acquired information to the call center through the in-vehicle communicator 97.

The following provides a detailed description of informations to be displayed by the display devices and voices to be reproduced by the acoustic devices, which are generated as the information to be presented to the driver and the other occupants during the above-described execution of pre-evacuation control and automatic evacuation control. First of all, the first and second notifications generated under pre-evacuation control will be described in detail with reference to FIGS. 9 to 13.

Figure 9:
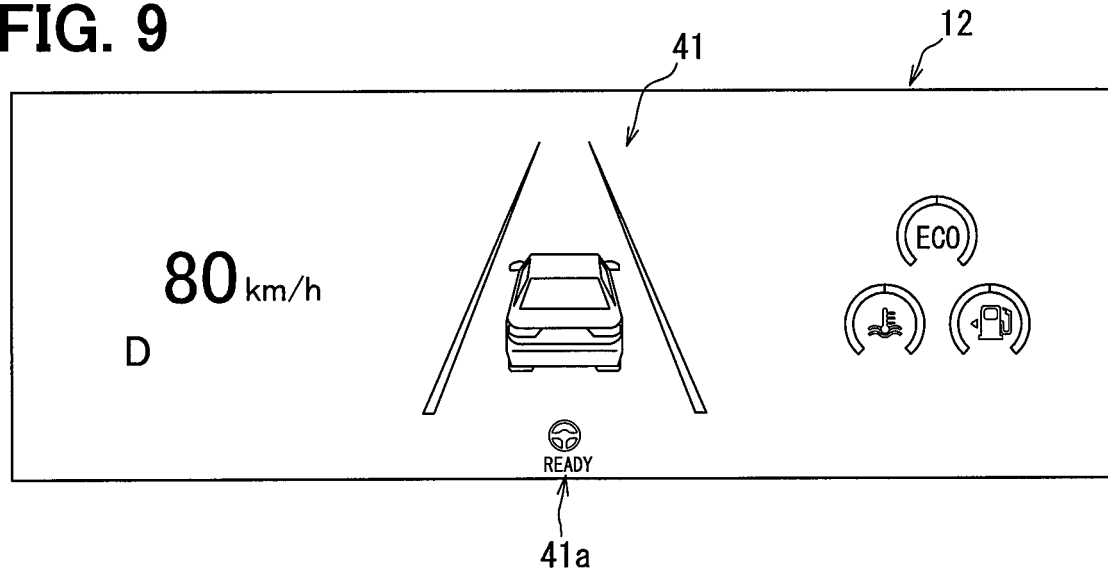
FIG. 9 is a diagram illustrating information that is displayed on a combination meter when a first notification is generated for first pre-evacuation control.

When the first notification is generated based on the tentative determination of an abnormal state (see T3 of FIG. 5), the combination meter 12 displays an indicator 41*a* indicative of LKA activation on the display screen 12*a* in addition to the other on-screen information as in FIG. 9. The HUD apparatus 14 projects an indicator 46*a* indicative of LKA activation and a postural distortion icon 45 indicative of the detection of postural distortion onto the projection area 14*a* as in FIG. 10. The ultrasonic speakers 113 reproduce a notification sound to notify the driver of the detection of postural distortion. Furthermore, the audio speakers 112 reproduces an attention calling message to passengers of the vehicle A. Contents of the attention calling voice message include requesting a passenger to be seated, requesting a passenger to check or take care of the driver's state, or the like. The CID 13 illustrated in FIG. 13 may also display the indicator 41*a* indicative of the activation of the LKA on the display screen 13*a* in addition to other on-screen information.

Figure 11:
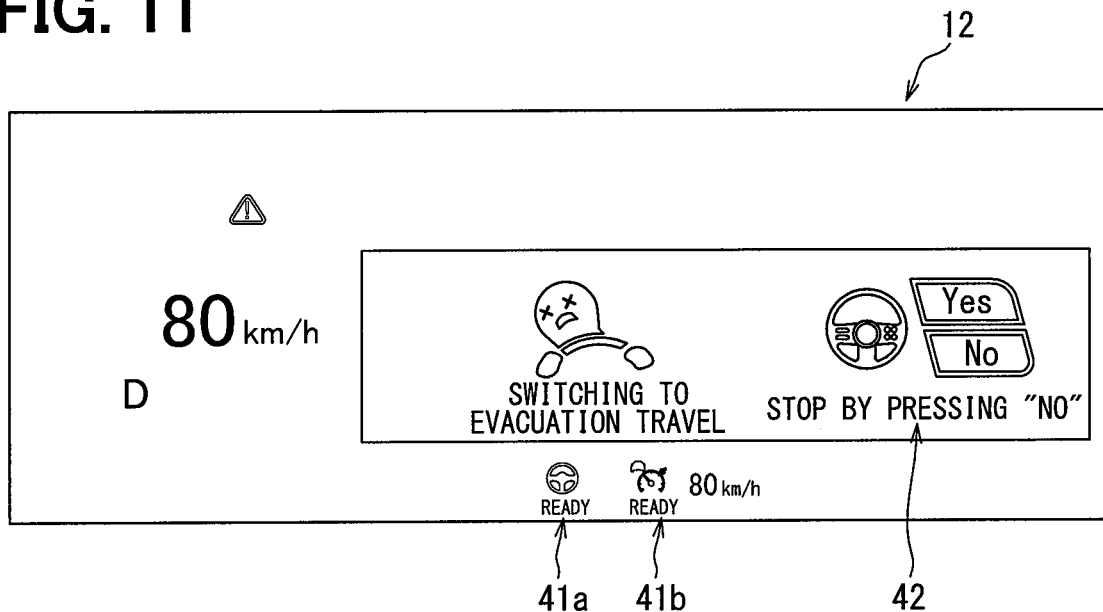
FIG. 11 is a diagram illustrating information that is displayed on the combination meter when a second notification is generated for second pre-evacuation control.

When the second notification is generated based on the formal determination of the abnormal state (see T4 of FIG. 5), the combination meter 12 displays an indicator 41*b* indicative of ACC activation and a message image 42 on the display screen 12*a* in addition to the LKA indicator 41*a* as in FIG. 11. The message image 42 is an image that uses text to give the driver the description of a detected abnormality and an advance notice of switching to automatic evacuation control. The message image 42 uses text to notify the driver of a procedure for canceling switching to automatic evacuation control and a procedure for forcibly switching to automatic evacuation control. The CID 13 illustrated in FIG. 13 may also display the indicator 41*b* indicative of the activation of the ACC on the display screen 13*a* in addition to the other on-screen information.

Figure 12:
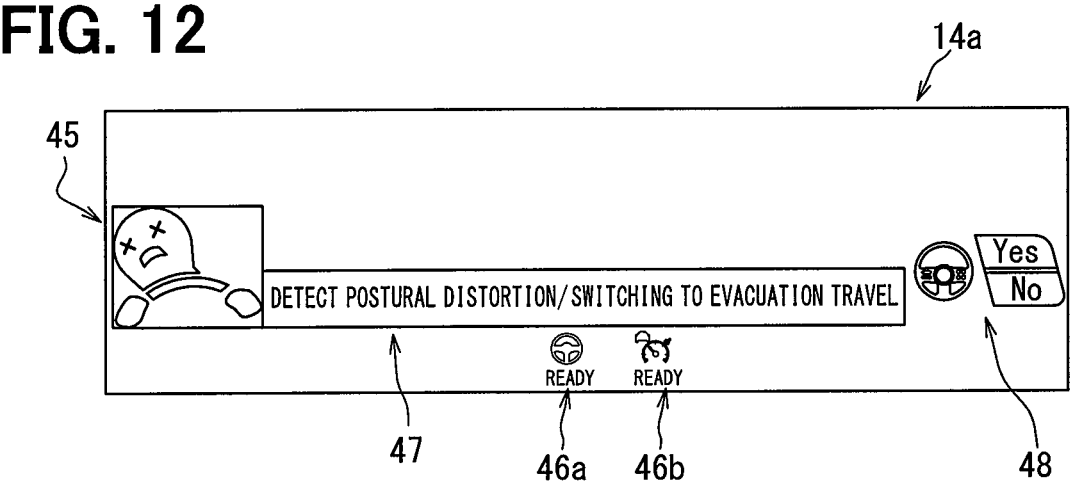
FIG. 12 is a diagram illustrating information that is projected by the HUD apparatus when the second notification is generated.

As the second notification, the HUD apparatus 14 (see FIG. 1) projects an indicator 46*b* indicative of ACC activation onto the lower edge of the projection area 14*a* in addition to an LKA indicator 46*a* as in FIG. 12. Further, the HUD apparatus 14 projects a message image 47 and a manipulating icon 48 onto the center of the projection area 14*a* in addition to the postural distortion icon 45. As is the case with the message image 42 (see FIG. 8) displayed on the combination meter 12, the message image 47 uses text to give the driver the description of a detected abnormality and an advance notice of switching to automatic evacuation control. The manipulating icon 48 notifies the driver that the steering switch 15*a* (see FIG. 1) can be manipulated to perform a procedure for canceling switching to automatic evacuation control or a procedure for forcibly switching to automatic evacuation control.

Figure 13:
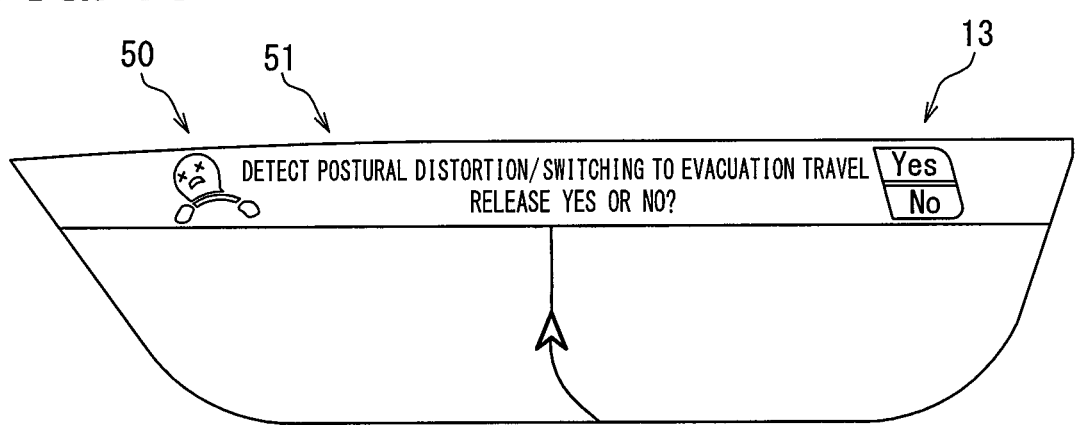
FIG. 13 is a diagram illustrating information that is displayed on a CID when the second notification is generated.

As the second notification, the CID 13 displays a postural distortion icon 50 and a message image 51 on the display screen 13*a* as in FIG. 13. The postural distortion icon 50 and the message image 51 have substantially the same shape as the postural distortion icon 45 and the message image 47 (see FIG. 9), which are projected onto the projection area 14*a*. Information displayed on the CID 13 is visible to not only the driver but also the other occupants of the vehicle A (see FIG. 1).

Further, when the second notification is generated, the audio speakers 112 emit a notification sound based on formal determination toward the occupants. Subsequently to the emission of the notification sound, the audio speakers 112 emit a guide voice toward the occupants in order to give the occupants an advance notice of switching to automatic evacuation control. The audio speakers 112 reproduce a message saying, for example, "POSTURAL DISTORTION DETECTED. SWITCHING SHORTLY TO EVACUATION TRAVELING. PRESS STEERING SWITCH TO CANCEL SWITCHING." Sound volume and/or sound frequency of the notifications from the audio speakers 112 may be controlled to differ between those when the formal determination is made (see T4 in FIG. 5) and those when the tentative determination is made (see T3 in FIG. 4), so that, for example, the notifications issued when the formal determination is made is more noticeable than those when the tentative determination is made. For example, the sound volume of the notifications from the audio speakers 112 when the formal determination is made may be larger than when the tentative determination is made. Additionally or alternatively, the sound frequency when the formal determination is made may be higher than when the tentative determination is made.

The execution notification generated under automatic evacuation control will now be described in detail with reference to FIGS. 14 to 16. Referring to progress images 151, 141 in FIGS. 14 and 15, dotted areas indicate an extinguished state, and white areas indicate an illuminated state.

Figure 14:
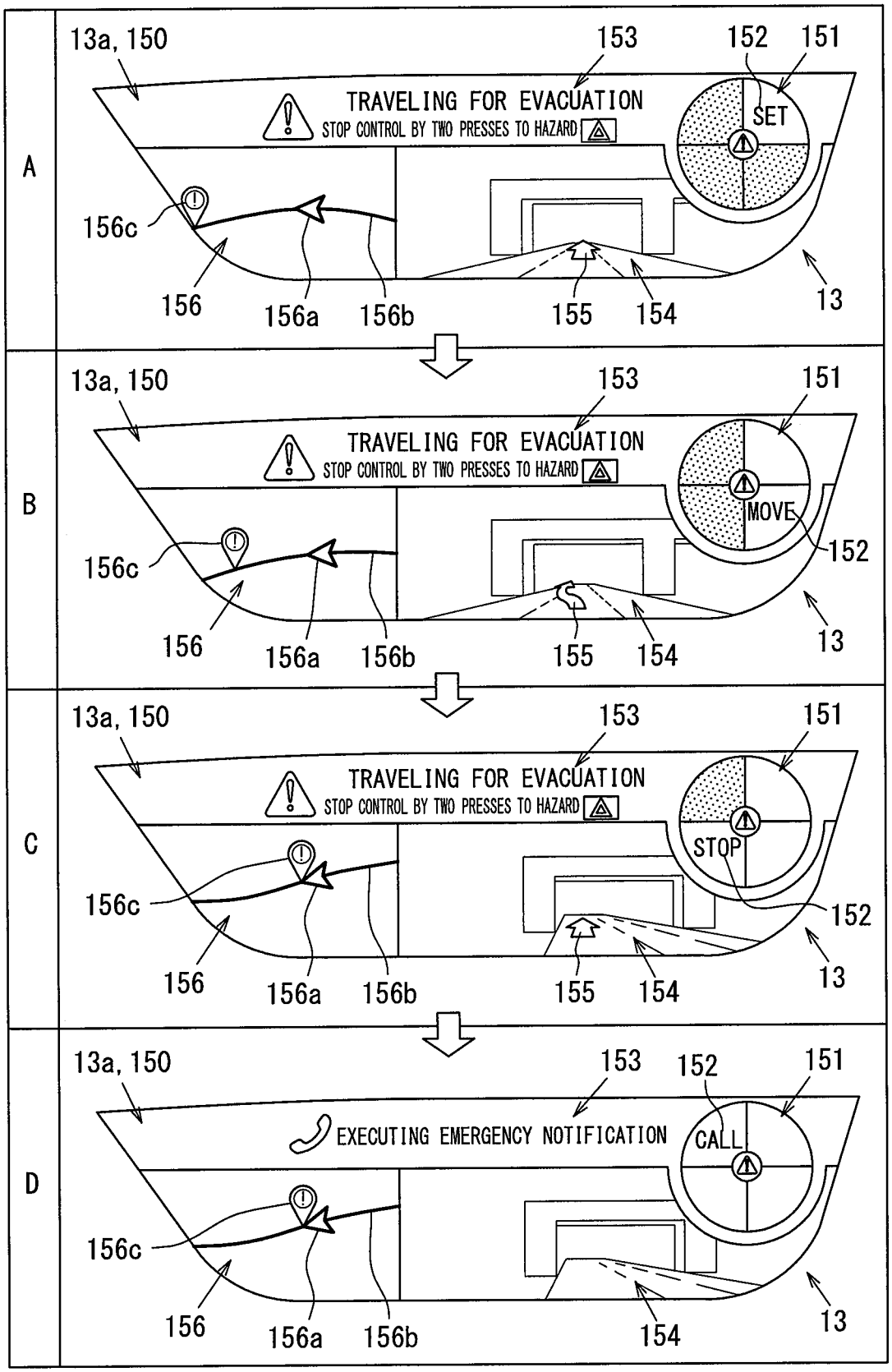
FIG. 14 is a diagram illustrating changes in the information that is displayed on the CID when a notification of the execution of automatic evacuation control is issued.

When the execution notification is generated based on the conclusive determination of the driving difficulty state (see T6 of FIG. 7), the CID 13 displays the occupant notification on-screen information 150 on the display screen 13*a* as in FIG. 14. The occupant notification on-screen information 150 is displayed to convey information about automatic evacuation control mainly to an occupant seated in the front passenger seat 17*p* (see FIG. 1) when information about the execution of automatic evacuation control is acquired by the information acquisition section 31 (see FIG. 8). FIGS. 14A to 14D illustrate how the occupant notification on-screen information 150 is displayed in the setup process, the movement process, the stop process, and the call process, respectively. As is the case with the display screen 13a, the occupant notification on-screen information 150 is long from side to side. The occupant notification on-screen information 150 includes a progress image 151, an explanation image 152, a message image 153, a captured image 154, and a map image 156.

The progress image 151 is circular in shape. The progress image 151 is circumferentially divided into a plurality of (four) zones. The progress image 151 intermittently illuminates a zone representing a currently executed process, that is, cyclically alternates such a zone between a bright state and a dark state (flashing). Further, the progress image 151 steadily illuminates a zone representing a terminated process. Therefore, as the process for automatic evacuation control progresses, the progress image 151 rotates an intermittently illuminated zone in a clockwise direction and increments the number of steadily illuminated zones by one. As described above, the progress image 151 indicates the progress of automatic evacuation control in a stepwise manner. Additionally, an image descriptive of a brace position to prepare for an emergency and/or an image showing that manipulating the hazard switch 15b two times stops the automatic evacuation control may be displayed to passengers on the front and rear passenger seats. In this regard, the brace position may be different between the front passenger seat and the rear passenger seat. The contents of the above images may be presented to passengers by display such as the CID 13, or alternatively or additionally may be presented to the passengers in form of voice messages from the audio speakers 112. Additionally, after the conclusive determination of the driving difficulty state (see T6 in FIG. 7), the CID 13 and the combination meter 12 may continue displaying the indicator 41a indicative of the activation of the LKA and the indicator 41b indicative of the activation of the ACC. A reason for this display control is that the vehicle A travels in the currently-traveling lane for a while after the automatic evacuation control is initiated.

Each zone can be intermittently illuminated as the background of the explanation image 152. As regards an intermittently illuminated zone, the time during which the zone is kept bright (e.g., 0.7 seconds) is set to be longer than the time during which the zone is extinguished and kept in a dark state (0.3 seconds). Intervals at which each zone is intermittently illuminated (e.g., 1.0 second) are set to be equivalent to the normal heart rate of a human being.

The explanation image 152 uses text to describe a currently executed process, that is, one of a plurality of processes executed under automatic evacuation control. More specifically, the explanation image 152 includes a text group, such as "EVACUATION PATH SETUP," "MOVE TO EVACUATION SPOT," "STOP AT EVACUATION SPOT," or "EMERGENCY CALL." The explanation image 152 is displayed in such a manner that a specific text group is displayed over a zone of the progress image 151. The explanation image 152 and the progress image 151 are displayed within a portion of the display screen 13a that is closer to the driver seat 17d (see FIG. 1) than to the front passenger seat 17p (see FIG. 1).

The message image 153 uses text to provide guidance information about the current traveling of the vehicle under automatic evacuation control and a responsive action to be taken with respect to currently exercised automatic evacuation control. More specifically, the message image 153 includes, for example, a message saying "TRAVELING FOR EVACUATION" and a manipulating procedure for stopping automatic evacuation control. The message image 153 is displayed on the upper edge of the display screen 13a. When switching is made to the call process, the contents of the message image 153 change from a message for the reporting of traveling under automatic evacuation control (FIGS. 14A to 14C) to a message for the reporting of the execution of emergency notification (FIG. 14D). After completion of emergency notification, however, the message image 153 may be replaced by a message image saying, for example, "REMAIN IN VEHICLE" in order to recommend that the driver stay in the vehicle.

Figure 2A:
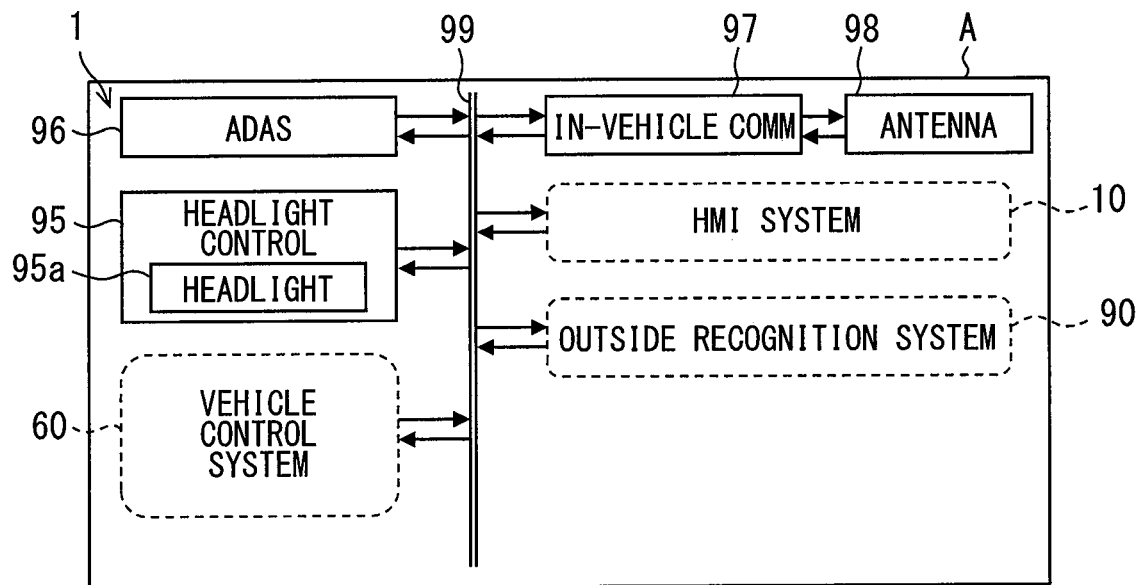
FIG. 2A is a block diagram illustrating an overall configuration of an in-vehicle network.
Figure 2B:
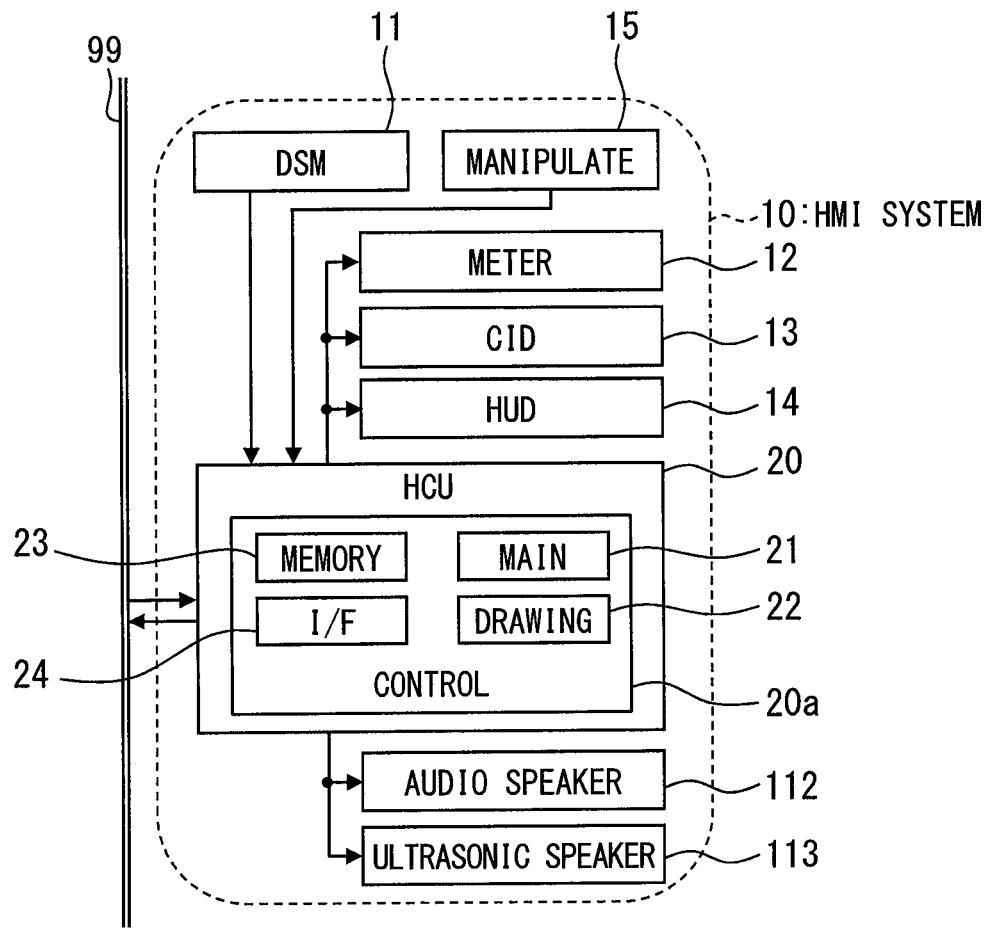
FIG. 2B is a block diagram illustrating a configuration of an HMI.
Figure 2C:
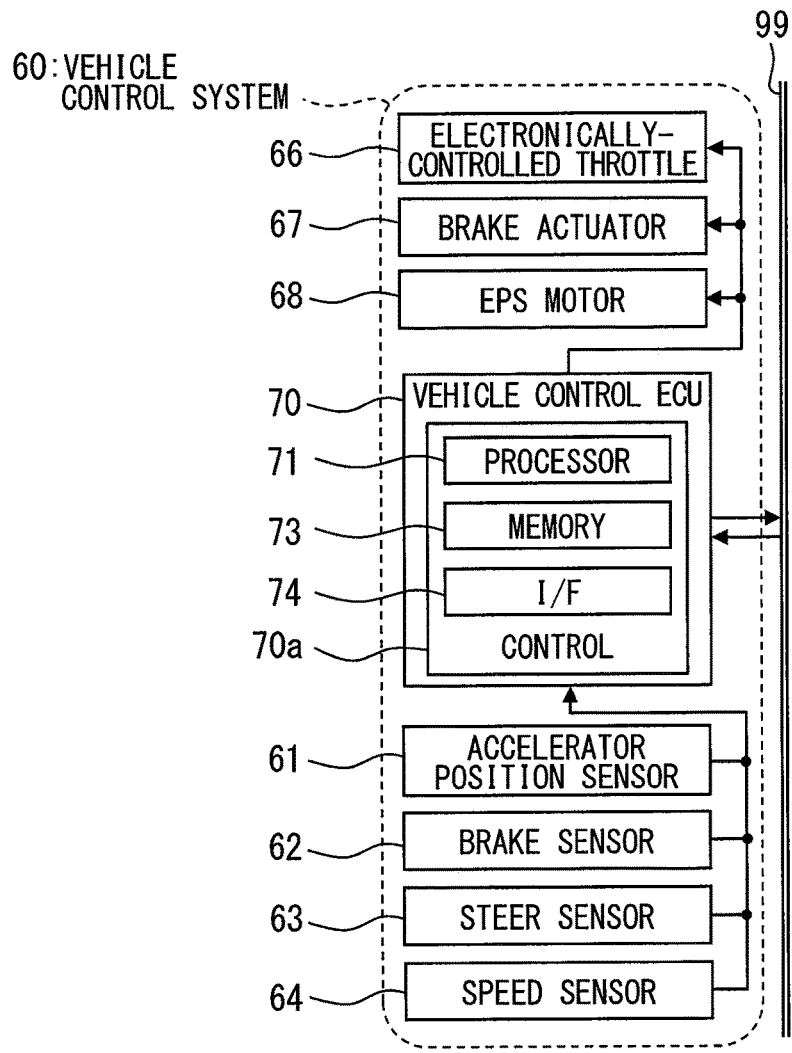
FIG. 2C is a block diagram illustrating a configuration of a vehicle control system.
Figure 2D:
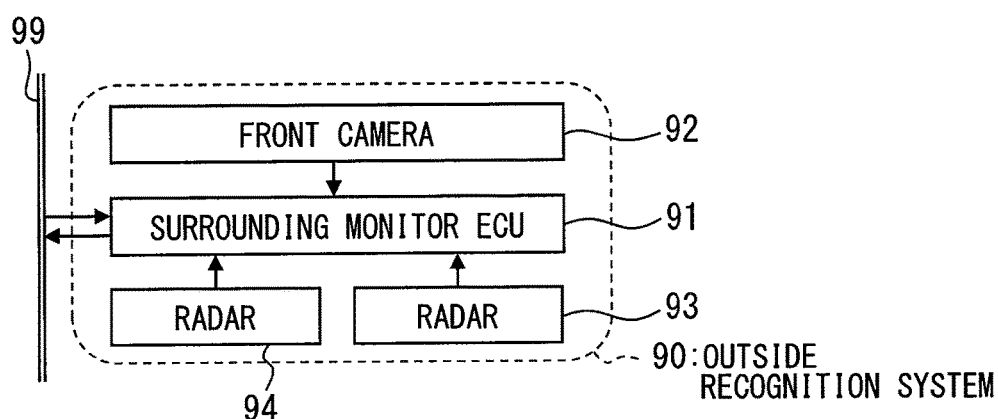
FIG. 2D is a block diagram illustrating a configuration of an outside recognition system.
Figure 3:
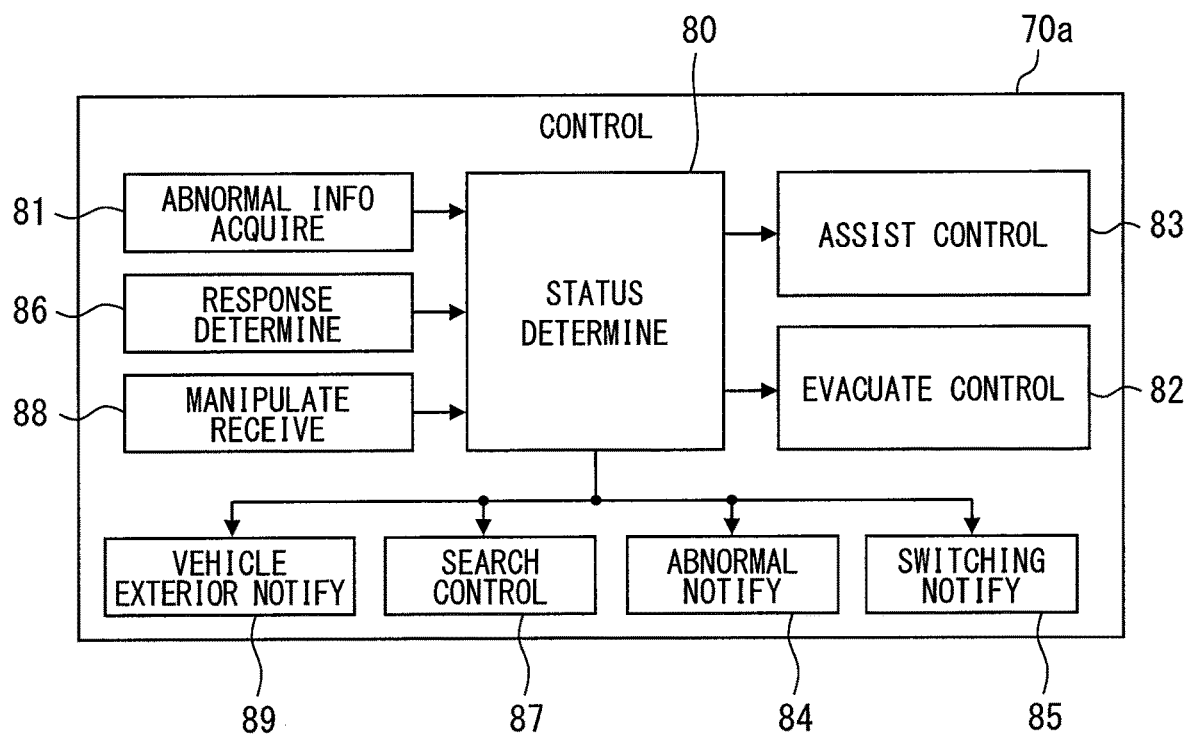
FIG. 3 is a diagram illustrating functional blocks built in a control circuit of a vehicle control ECU.

The captured image 154 is an image captured by the front camera unit 92 (see FIG. 2D). The captured image 154 shows the planned travel path that is planned under automatic evacuation control. A path indicator image 155 in the form of an arrow is superimposed over the captured image 154. The path indicator image 155 is drawn based on information about the planned travel path that is set under automatic evacuation control. The path indicator image 155 can expressly indicate the planned travel path shown within the captured image 154. The captured image 154 is displayed horizontally together with the map image 156.

The map image 156 informs the occupants of the evacuation spot, which is selected under automatic evacuation control, together with the shape of a road around the vehicle A (see FIG. 1). More specifically, the map image 156 includes a host vehicle icon 156a indicative of the position of the vehicle A, a road image 156b indicative of the shape of the road around the vehicle A, and a stop icon 156c indicative of the evacuation spot. The map image 156, which is displayed on the display screen 13a, is positioned more closely to the front passenger seat 17p than the captured image 154.

Figure 15:
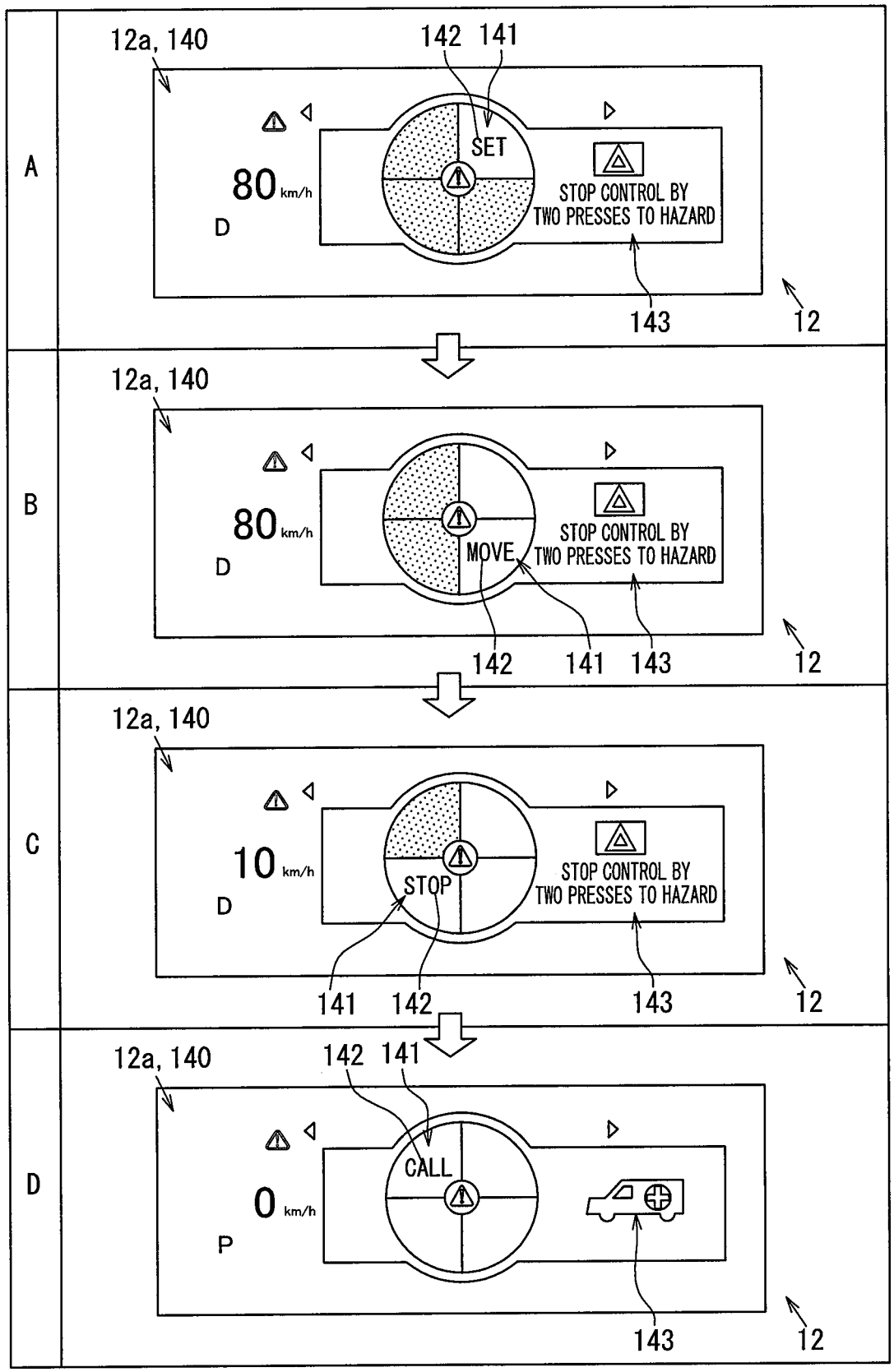
FIG. 15 is a diagram illustrating changes in the information that is displayed on the combination meter when the notification of the execution of automatic evacuation control is issued.

As in FIG. 15, the combination meter 12 displays the driver notification on-screen information 140 on the display screen 12a as the execution notification. The driver notification on-screen information 140 presents information about automatic evacuation control to the driver seated in the driver seat 17d (see FIG. 1). FIGS. 15A to 15D illustrate how the driver notification on-screen information 140 is displayed in the setup process, the movement process, the stop process, and the call process, respectively. The driver notification on-screen information 140 is displayed on the display screen 12a and superimposed over normal information displayed on the combination meter 12. The driver notification on-screen information 140 includes a progress image 141, an explanation image 142, and a guidance image 143.

The progress image 141 has substantially the same form as the progress image 151 for the occupant notification on-screen information 150 (see FIG. 14). As the process for automatic evacuation control progresses, the progress image 141 rotates an intermittently illuminated zone in a clockwise direction. As a result, the progress image 141 indicates the current progress of automatic evacuation control. The explanation image 142 has substantially the same form as the explanation image 152 for the occupant notification on-screen information 150 (see FIG. 14), and is superimposed over the progress image 141. The progress image 141 and the explanation image 142 are positioned at the center of the display screen 12a. In the first embodiment, the number of processes indicated by the progress image 151 for the occupant notification on-screen information 150 is set to be the same as the number of processes indicated by the progress image 141 for the driver notification on-screen information 140.

As is the case with the message image 153 for the occupant notification on-screen information 150 (see FIG.

14), the guidance image 143 uses text to provide guidance information about a responsive action to be taken with respect to currently exercised automatic evacuation control. The guidance image 143 is displayed on the display screen 12a and positioned, for example, to the right of the progress image 141 and the explanation image 142. When switching is made to the call process, the guidance image 143 switches from a message indicative of a procedure for stopping automatic evacuation control (FIGS. 15A to 15C) to an icon indicative of the placement of an emergency call (FIG. 15D).

Figure 16:
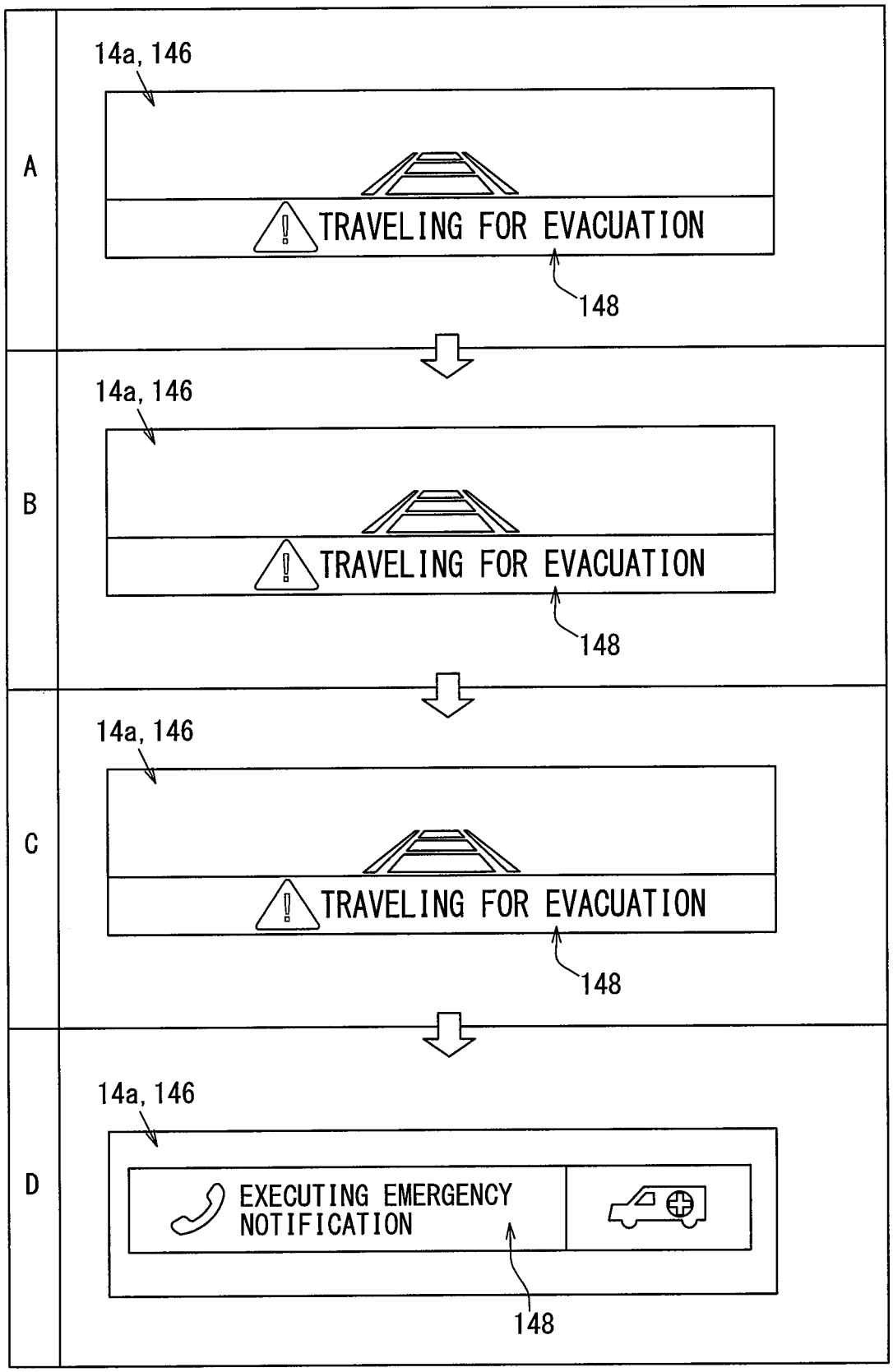
FIG. 16 is a diagram illustrating changes in the information that is projected by the HUD apparatus when the notification of the execution of automatic evacuation control is issued.

As in FIG. 16, the HUD apparatus 14 (see FIG. 1) displays the driver notification on-screen information 146 in the projection area 14a as the execution notification. The driver notification on-screen information 146 is displayed together with the driver notification on-screen information 140 on the combination meter 12 (see FIG. 15) in order to convey information about automatic evacuation control to the driver. FIGS. 16A to 16D illustrate how the driver notification on-screen information 146 is displayed in the setup process, the movement process, the stop process, and the call process, respectively. The driver notification on-screen information 146 includes at least a message image 148.

As is the case with the message image 153 for the occupant notification on-screen information 150 (see FIG. 14), the message image 148 uses text to provide guidance information about the current traveling of the vehicle under automatic evacuation control. The message image 148 is displayed on the lower edge of the projection area 14a. When switching is made to the call process, the contents of the message image 148 change from a message for the reporting of traveling under automatic evacuation control (FIGS. 16A to 16C) to a message for the reporting of the execution of emergency notification (FIG. 16D).

Further, as the process for automatic evacuation control progresses, the audio speakers 112 shown in FIG. 1 reproduce a notification sound and a voice message for execution notification. At the beginning of execution notification, the audio speakers 112 reproduce a voice saying "BEGINNING TO TRAVEL FOR EVACUATION" (T6 of FIG. 7, voice 1). Additionally, when the evacuation spot and the planned travel path are completely set, the audio speakers 112 reproduce a voice saying "EVACUATION SPOT IS SET."

When switching is made from the setup process to the movement process, a voice saying "MOVING TO EVACUATION SPOT" is reproduced (T7 of FIG. 7, voice 2). At the beginning of a lane change in the movement process, a voice saying "INITIATING LANE CHANGE. PRESS HAZARD SWITCH TWO TIMES IN SUCCESSION TO STOP LANE CHANGE. VEHICLES NEARBY BEING NOTIFIED OF EVACUATION TRAVELING" is reproduced (T8 of FIG. 7, voice 3). Upon completion of the lane change, a voice saying "LANE CHANGE COMPLETED" is reproduced (T9 of FIG. 7, voice 4).

When switching is made from the movement process to the stop process, a voice saying "STOPPING SHORTLY AT SAFE PLACE" is reproduced (T10 of FIG. 7, voice 5). When the vehicle stops at the evacuation spot, a voice saying "STOPPED AT EVACUATION SPOT" is reproduced (T11 of FIG. 7, voice 6). When switching is made from the stop process to the call process, a voice saying "EVACUATION SPOT REPORTED TO CALL CENTER" is reproduced (T12 of FIG. 7, voice 7). When the vehicle A is stopped on, for example, a freeway such as an express highway, it is highly likely that, in the outside of the vehicle A, different vehicles travel at high speeds. In view of this, after the vehicle A is stopped or the call process is completed, a notification is issued to the occupants of the vehicle A, the notification instructing the occupants not to get out of the vehicle A, whereby a secondary accident is prevented. The above notification may be presented in form of image displayed by, for example, the CID 12 and/or in form of voice message reproduced by, for example, the speakers 112. Additionally, information on preparation of an ambulance or positional information of a hospital at a close distance may be presented in form of image displayed by, for example, the CID 12 and/or in form of voice message reproduced by, for example, the speakers 112.

Figure 17:
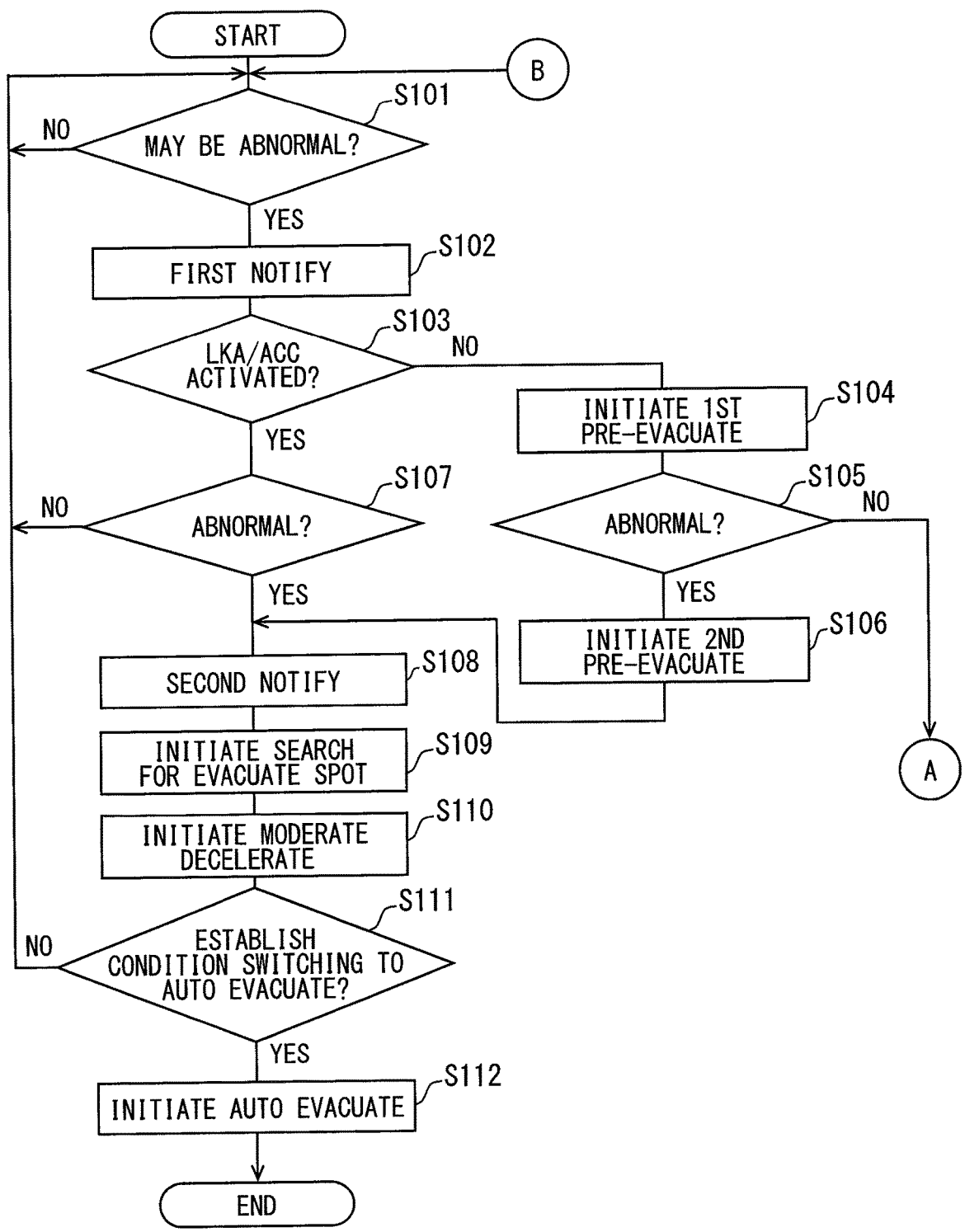
FIG. 17 is a flowchart illustrating a process performed by a control circuit of the vehicle control ECU.
Figure 18:
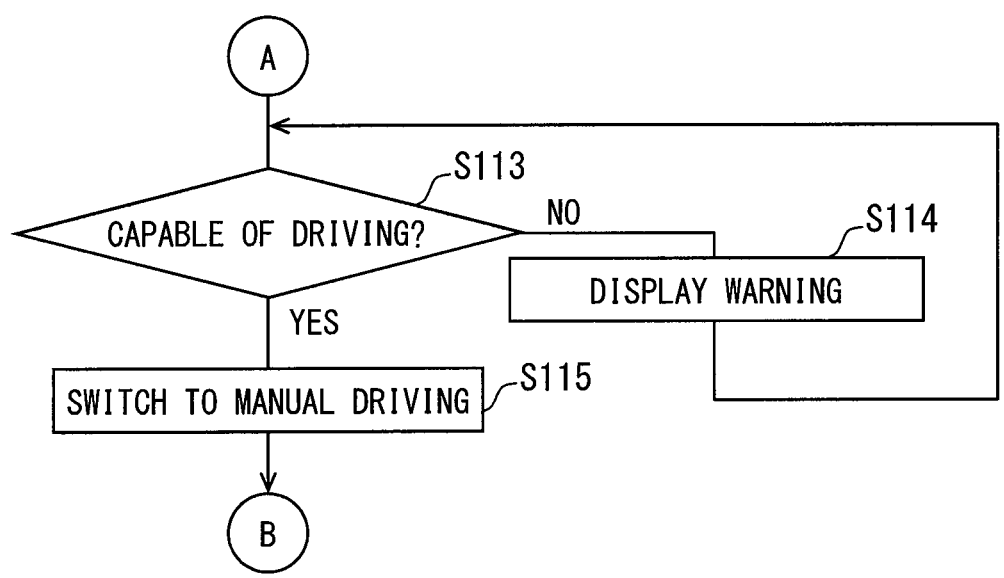
FIG. 18 is a flowchart illustrating a process performed by the control circuit of the vehicle control ECU.

A process performed by the control circuit 70a before the start of automatic evacuation control will now be described in detail based on FIGS. 17 and 18 while referring to FIGS. 1 and 2A to 2D. The control circuit 70a starts the process in the flowcharts of FIGS. 17 and 18 when a selector lever 16 (see FIG. 1) is placed in the D range in order to permit the vehicle A to travel.

It is noted that a flowchart described in the present application includes sections (also referred to as steps), each of which is represented, for instance, as S101. Further, each section can be divided into several sub-sections while several sections can be combined into a single section. Furthermore, each of thus configured sections can be also referred to as a device, a module, or a specific name; for instance, a determination section may be referred to as a determination device, a determination module, or a determiner. Each or any combination of sections explained in the above can be achieved as (i) a software section in combination with a hardware unit (e.g., computer) or (ii) a hardware section (e.g., integrated circuit, hard-wired logic circuit), including or not including a function of a related apparatus; furthermore, the hardware section may be constructed inside of a microcomputer.

In S101, it is determined based on the information detected by the DSM 11 whether the driver may be abnormal. If a driver abnormality is continuously detected for a period of longer than the first threshold period of time TH1, it is tentatively determined in S101 that the driver may be abnormal (T3 of FIG. 4). Processing proceeds to S102. In S102, the HMI system 10 is used to generate the first notification. Processing proceeds to S103. By contrast, if the driver abnormality is not detected for a period of longer than the first threshold period of time TH1, S101 is repeated to continuously monitor the driver.

In S103, it is determined whether the driving assistance functions are activated. If the LKA and the ACC are both activated, processing proceeds to S107. By contrast, if at least one of the LKA and the ACC is deactivated, processing proceeds to S104. In S104, first pre-evacuation control is initiated to activate the LKA. Processing proceeds to S105.

In S105, it is determined based on the information detected by the DSM 11 whether the driver is abnormal. If a driver abnormality is not continuously detected for a period of longer than the second threshold period of time TH2, processing proceeds to S113.

In S113, it is determined, based, for example, on a driving posture indicated by the information detected by the DSM 11 and on the steering force detected by the steering torque sensor 63, whether the driver is capable of driving properly. If the result of determination in S113 does not indicate that the driver is in an improved driving posture or performing a proper steering operation, processing proceeds to S114. In S114, a warning indicative, for example, of inattentive driving is displayed. Processing returns to S113. By contrast, if the result of determination in S113 indicates, for example, an improved driving posture or a restored steering torque, processing proceeds to S115. In S115, the LKA is deactivated to switch to manual driving. Processing returns to S101.

Figure 4:
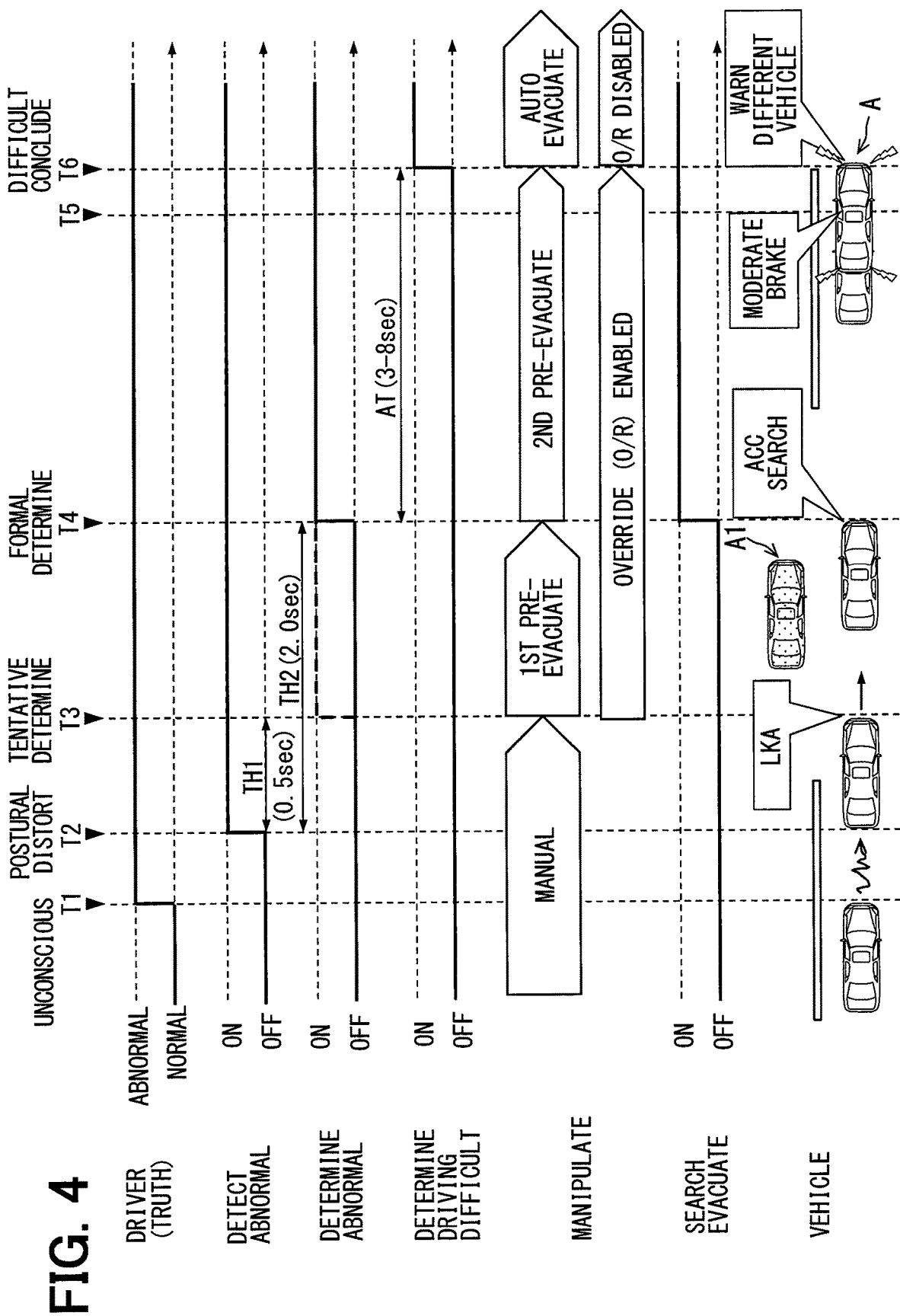
FIG. 4 is a timing diagram illustrating a process that is performed during the interval between the occurrence of abnormality to a driver and the start of automatic evacuation control.
Figure 5:
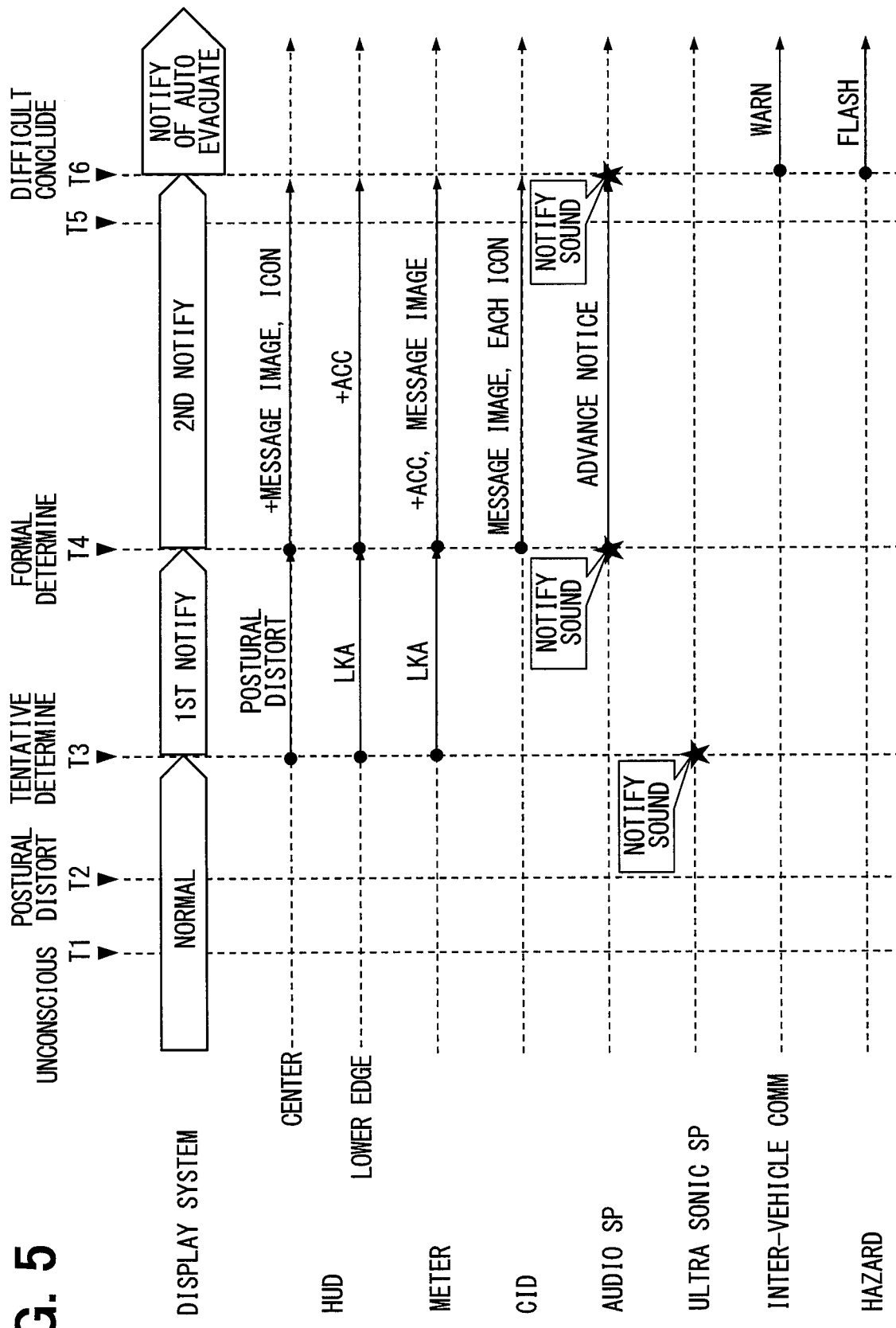
FIG. 5 is a timing diagram illustrating a process that is performed during the interval between the occurrence of abnormality to the driver and the start of automatic evacuation control.

Meanwhile, if the driver abnormality is continuously detected in S105 for a period of longer than the second threshold period of time TH2, it is formally determined that the driver is abnormal (T4 of FIG. 4). Processing proceeds to S106. In S106, second pre-evacuation control is initiated to additionally activate the ACC. Processing proceeds to S108.

In S107, it is determined whether the driver is abnormal, as is the case with S105. If a driver abnormality is not continuously detected for a period of longer than the second threshold period of time TH2, processing returns to S101. By contrast, if the driver abnormality is continuously detected for a period of longer than the second threshold period of time TH2, it is formally determined in S107 that the driver is abnormal (T4 of FIG. 4). Processing proceeds to S108.

In S108, the HMI system 10 is used to generate the second notification. Processing proceeds to S109. In S109, the search request information is outputted to the surroundings monitoring ECU 91 in order to let the surroundings monitoring ECU 91 search for an evacuation spot. Processing proceeds to S110. In S110, braking control is initiated to moderately decelerate the vehicle A (T5 of FIG. 4). Processing proceeds to S111.

In S111, it is determined whether the condition for switching to automatic evacuation control is established. If the "YES" button of the steering switch 15a is manipulated in S111 to cancel switching to automatic evacuation control, processing returns to S101. By contrast, if the "NO" button of the steering switch 15a is manipulated to permit switching to automatic evacuation control or the steering switch 15a is not manipulated for a period equivalent to the response time AT, processing proceeds to S112. In S112, automatic evacuation control is initiated to terminate the series of processes. The processes performed in S112 to notify a different vehicle A1 of the driving difficulty state include establishing vehicle-to-vehicle communication to distribute a warning, intermittently illuminating the hazard lamps, and steadily illuminating the main-beam headlights 95a (see T6 of FIG. 7).

Figure 19:
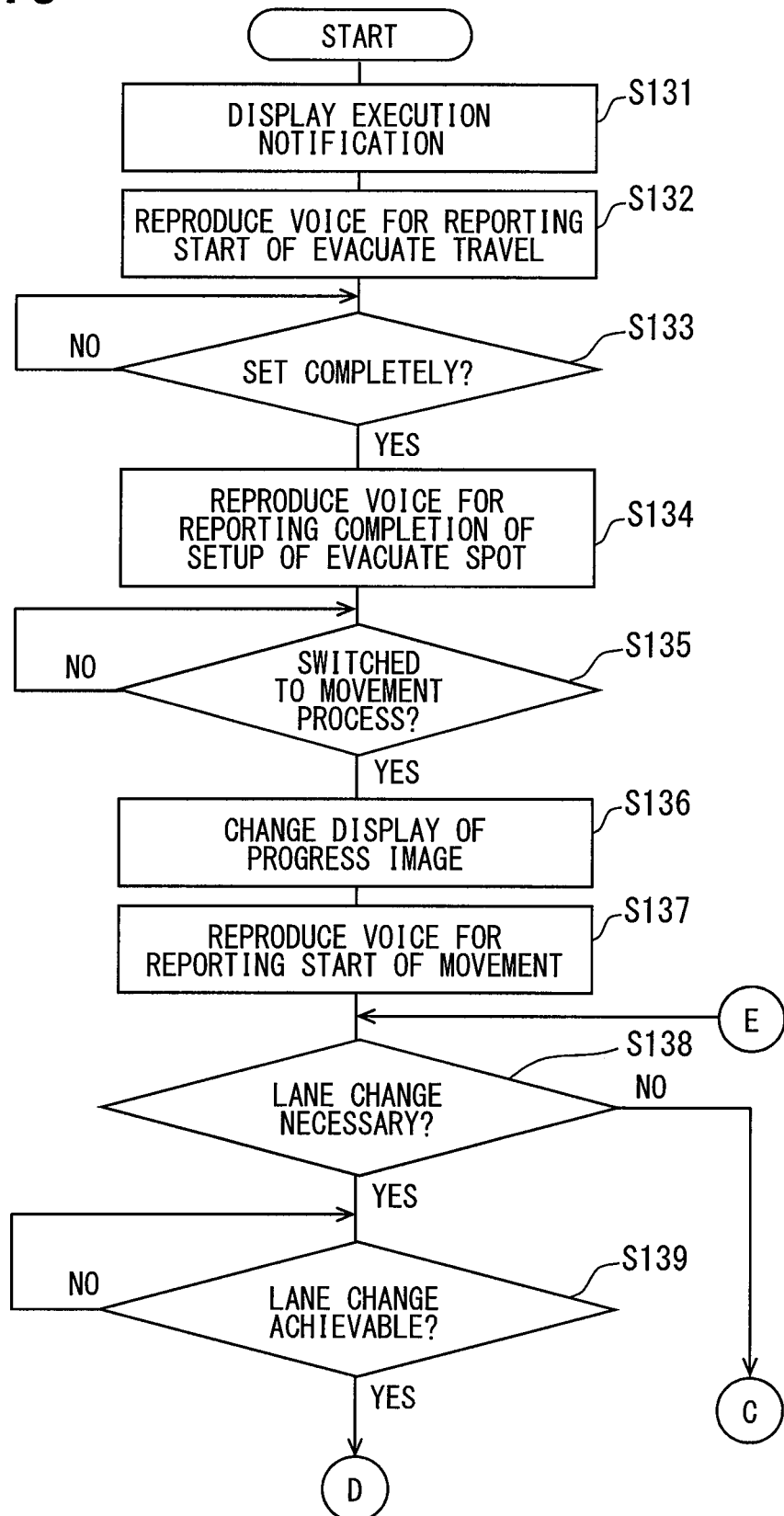
FIG. 19 is a flowchart illustrating a process performed by a control circuit of the HCU.
Figure 20:
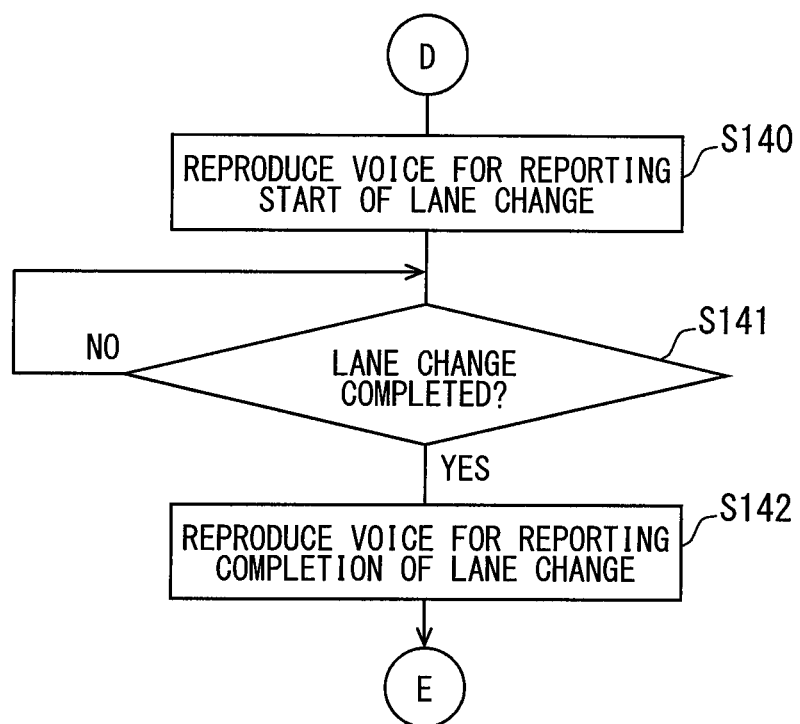
FIG. 20 is a flowchart illustrating a process performed by the control circuit of the HCU.
Figure 21:
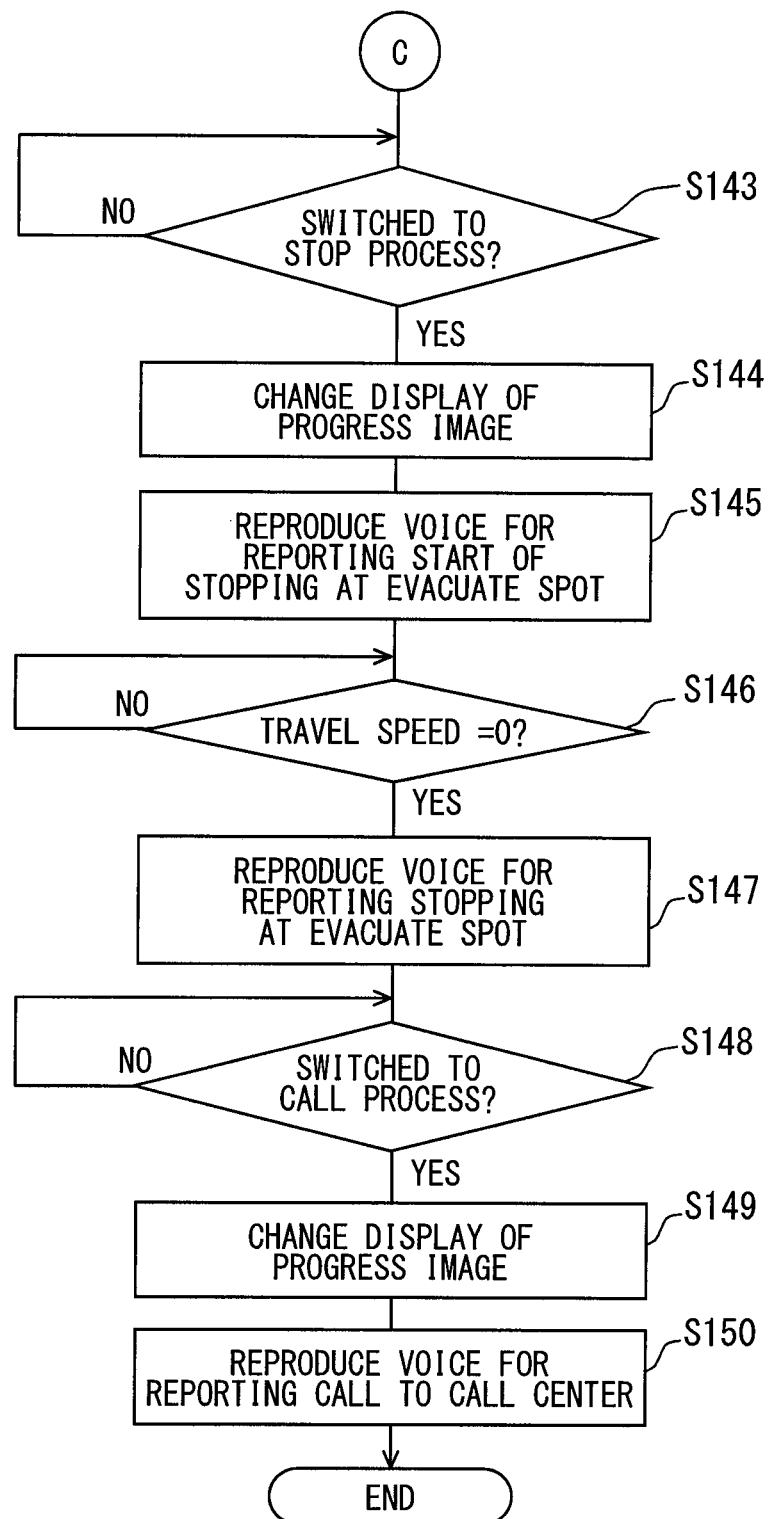
FIG. 21 is a flowchart illustrating a process performed by the control circuit of the HCU.

A process performed by the control circuit 20a after the start of automatic evacuation control will now be described in detail based on FIGS. 19 to 21 while referring to FIGS. 1 and 2A to 2D. The control circuit 70a starts the process in the flowcharts of FIGS. 19 to 21 when the driving difficulty state is conclusively determined.

In S131, the informations displayed by the combination meter 12, the CID 13, and the HUD apparatus 14 are replaced by the notification on-screen informations 140, 150, 146 for execution notification. Processing proceeds to S132. In S132, the audio speakers 112 reproduce a voice for reporting the start of evacuation traveling (T6 of FIG. 7, voice 1). Processing proceeds to S133.

In S133, it is determined whether the evacuation spot and the planned travel path are completely set under automatic evacuation control. In S133, a standby state continues until the evacuation spot and the planned travel path are completely set. Upon completion of setup of the evacuation spot and planned travel path, processing proceeds to S134. In S134, the audio speakers 112 reproduce a voice for reporting the completion of evacuation spot setup. Processing proceeds to S135.

In S135, information about automatic evacuation control operation is acquired to determine whether the currently executed process is switched from the setup process to the movement process. In S135, a standby state continues until switching to the movement process is completed. Upon completion of switching to the movement process, processing proceeds to S136. In S136, the occupant notification on-screen information 150 (see FIGS. 14B and 15B) is generated by changing the progress images 141, 151 to on-screen information indicative of the movement process in progress. Processing proceeds to S137. In S137, the audio speakers 112 reproduce a voice for reporting the start of movement (T7 of FIG. 7, voice 2). Processing proceeds to S138.

In S138, it is determined based on the information about the planned travel path whether a lane change is necessary. If it is determined in S138 that a lane change is necessary, processing proceeds to S139. In S139, a standby state continues until the lane change can be made. When the lane change is found to be achievable, processing proceeds to S140. In S140, the audio speakers 112 reproduce a voice for reporting the start of the lane change (T8 of FIG. 7, voice 3). Processing proceeds to S141.

In S141, it is determined whether the lane change is completed. In S141, a standby state continues until the lane change is completed. When the lane change is completed, processing proceeds to S142. In S142, the audio speakers 112 reproduce a voice for reporting the completion of the lane change (T9 of FIG. 7, voice 4). Processing returns to S138. In S138, it is determined again whether a lane change is necessary.

If it is determined in S138 that no lane change is necessary, processing proceeds to S143. In S143, the information about automatic evacuation control operation is acquired to determine whether the currently executed process is switched from the movement process to the stop process. In S135, a standby state continues until switching to the stop process is completed. Upon completion of switching to the stop process, processing proceeds to S144. In S144, the occupant notification on-screen information 150 (see FIGS. 14C and 15C) is generated by changing the progress images 141, 151 to on-screen information indicative of the movement process in progress. Processing proceeds to S145. In S145, the audio speakers 112 reproduce a voice for reporting the start of stopping at the evacuation spot (T10 of FIG. 7, voice 5). Processing proceeds to S146.

In S146, it is determined based on the traveling speed of the vehicle A whether the vehicle A is stopped at the evacuation spot. In S146, a standby state continues until the vehicle A is stopped. When the vehicle A is stopped, processing proceeds to S147. In S147, the audio speakers 112 reproduce a voice for reporting that the vehicle A is stopped at the evacuation spot (T11 of FIG. 7, voice 6). Processing proceeds to S148.

In S148, the information about automatic evacuation control operation is acquired to determine whether the currently executed process is switched from the stop process to the call process. In S148, a standby state continues until switching to the call process is completed. Upon completion of switching to the call process, processing proceeds to S149. In S149, the occupant notification on-screen information 150 (see FIGS. 14D and 15D) is generated by changing the progress images 141, 151 to on-screen information indicative of the movement process in progress. Processing proceeds to S150. In S150, the audio speakers 112 reproduce a voice for reporting the placement of a call to the call center (T12 of FIG. 7, voice 7). A series of processes terminates.

According to the above-described first embodiment, the vehicle A can steadily travel as driving assistance control is exercised to prevent the deviation of the vehicle A from a traveling lane even during the interval between the detection of a driver abnormality and the determination of the driving difficulty state. Consequently, when the driver is having difficulty in driving the vehicle A, the vehicle control ECU 70 can properly switch to automatic evacuation control for automatically stopping the vehicle A at a place where the vehicle A may stop.

Further, as far as the LKA is activated as described in conjunction with the first embodiment, the vehicle A is prevented at least from staggering. Meanwhile, the driving assistance functions other than the LKA are activated with a delay. Therefore, when the driver is normal, the possibility of giving an uncomfortable feeling to the driver after the initiation of driving assistance control is reduced. Activating the LKA prior to the other driving assistance functions as described above will further assure that switching is certainly made to automatic evacuation control while reducing an uncomfortable feeling caused upon erroneous detection.

Furthermore, the first embodiment notifies the driver of a detected abnormality (e.g., postural distortion). The driver in a normal state can therefore improve to become normal and cancel switching to automatic evacuation control before the activation of a driving assistance function other than the LKA. This configuration for notifying the driver of a detected abnormality reduces an uncomfortable feeling that may be given to the driver upon erroneous detection of abnormality.

Moreover, the first embodiment makes a tentative determination to activate the LKA before making a formal determination. This immediately prevents the vehicle A from staggering. Meanwhile, the ACC is activated after the formal determination of an abnormal state. This further stabilizes the traveling of the vehicle A. When the driving assistance functions are activated in a stepwise manner based on an increase in the certainty of abnormality as described above, the vehicle control ECU 70 will further assure that switching is certainly made to automatic evacuation control while reducing an uncomfortable feeling caused upon erroneous detection.

Additionally, when it is determined that an abnormal state exists, the first embodiment not only exercises the LKA to control the steering of the vehicle, but also exercises the ACC to control the acceleration and deceleration of the vehicle A. Therefore, even when driving manipulations are inadequately performed by the driver, the vehicle A can continuously travel in a steady manner. This will further assure that switching is certainly made to automatic evacuation control.

Further, when given an advance notice of switching to automatic evacuation control as described in conjunction with the first embodiment, the driver in a normal state can surely act to cancel the switching to automatic evacuation control. This certainly avoids a situation where switching is made to automatic evacuation control based on an erroneous determination of the driving difficulty state.

Furthermore, when the driving difficulty state is conclusively determined by a manipulation performed by the driver, the first embodiment permits the vehicle control ECU 70 to immediately initiate automatic evacuation control without waiting for the lapse of the response time AT. Therefore, the time required for switching to automatic evacuation control is reduced. This will further assure that switching is certainly made to automatic evacuation control.

Moreover, the first embodiment permits the surroundings monitoring ECU 91 to search for an evacuation spot before the determination of a driving difficulty state. The search for the evacuation spot can therefore be completed during the interval between the determination of the driving difficulty state and the initiation of automatic evacuation control. Consequently, after the initiation of automatic evacuation control, the vehicle A can promptly move to the evacuation spot located by the search.

Additionally, the first embodiment prohibits an override after the initiation of automatic evacuation control. Therefore, even when the driver in the driving difficulty state unintentionally performs a steering or other manipulating procedure, the vehicle A can be prevented from traveling in an unstable manner. Consequently, automatic evacuation control is exercised to certainly stop the vehicle A without being interrupted by a wrong manipulating procedure.

Further, it is extremely unlikely that the driver in an abnormal state will press the hazard switch 15b two times in succession. Therefore, when the hazard switch 15b is set to function as a cancel switch, it is possible to prevent an erroneous interruption of automatic evacuation control and permit the driver in a normal state to perform an override.

Furthermore, the first embodiment allows the driver to stop pre-evacuation control by performing a driving manipulation to invoke an override. Therefore, even when, for example, the LKA is activated due to erroneous detection, the driver in a normal state can switch, without performing a troublesome manipulating procedure, to a manual driving mode in which no driving assistance function is activated.

Moreover, the first embodiment notifies a different vehicle A1 traveling in the vicinity of the vehicle A that the driver of the vehicle A is in the driving difficulty state. The driver or vehicle control ECU 70 of the different vehicle A1 can therefore cause the different vehicle A1 to travel so as not to obstruct the automatic evacuation of the vehicle A. Accordingly, establishing, for example, vehicle-to-vehicle communication to issue a notification to the different vehicle A1 is effective in bringing the vehicle A to a smooth stop under automatic evacuation control.

In the first embodiment, the hazard switch 15b is referred to also as a cancel switch, the surroundings monitoring ECU 91 is referred to also as an evacuation spot search apparatus, and the vehicle control ECU 70 is referred to as a travel control apparatus. Further, S101 is referred to also as acquiring abnormality information or as an abnormality information acquisition step, and S104 is referred to also as exercising assistance control or as an assistance control step. Moreover, S111 is referred to also as status determination or as a status determination step, and S112 is referred to also as exercising evacuation control or as an evacuation control step.

Second Embodiment

Figure 22:
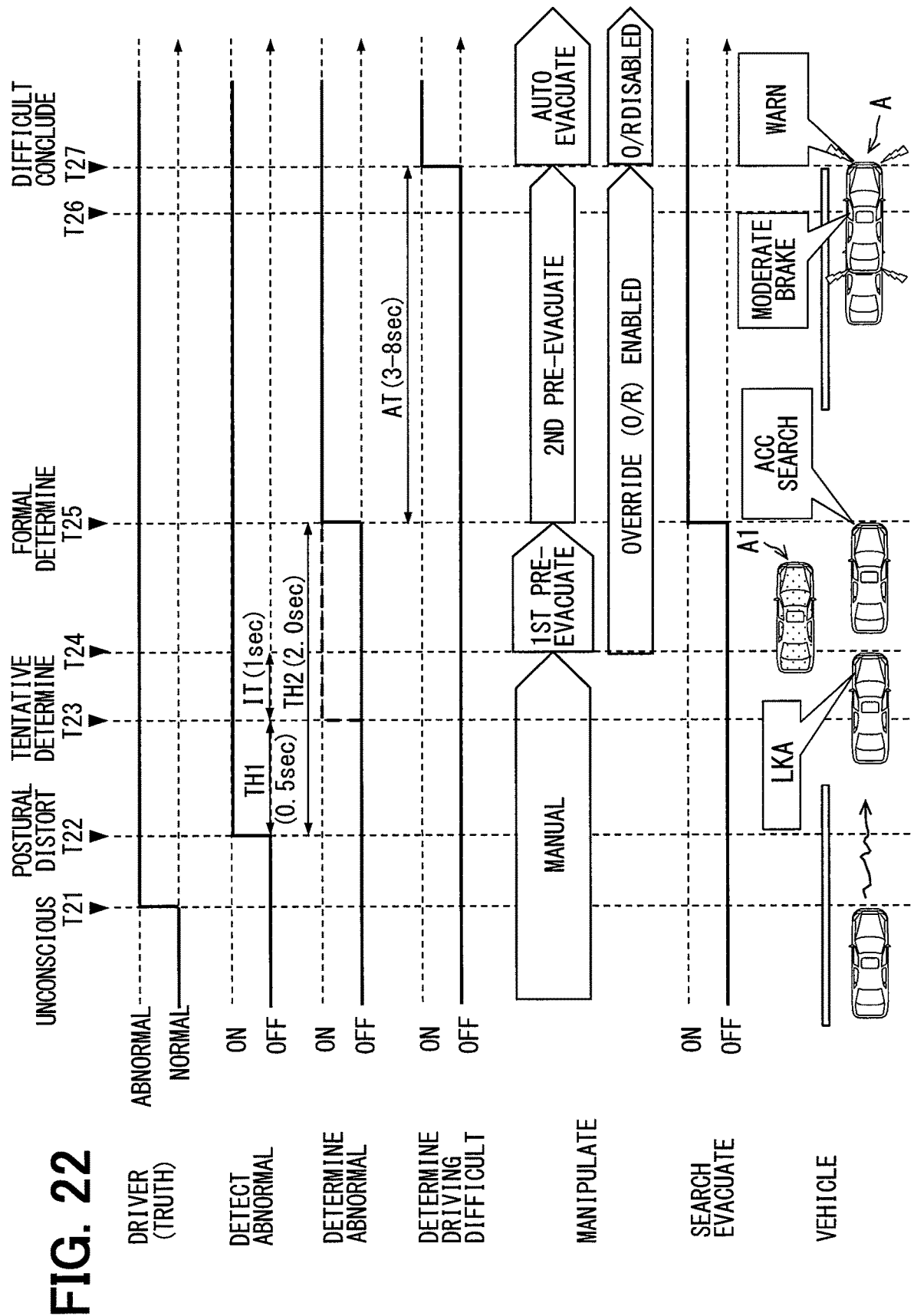
FIG. 22 is a diagram illustrating a modification of FIG. 4.
Figure 23:
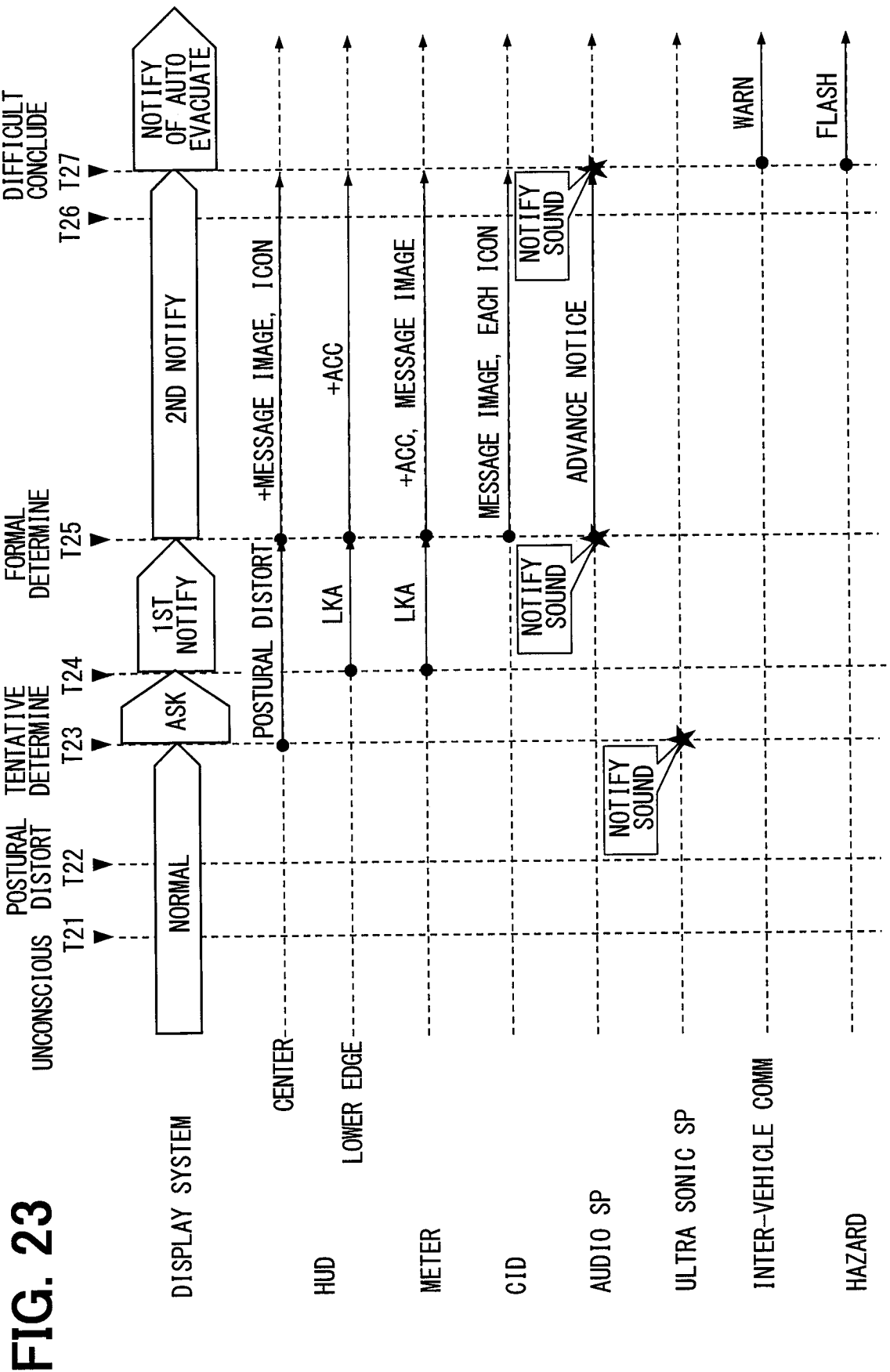
FIG. 23 is a diagram illustrating a modification of FIG. 5.
Figure 24:
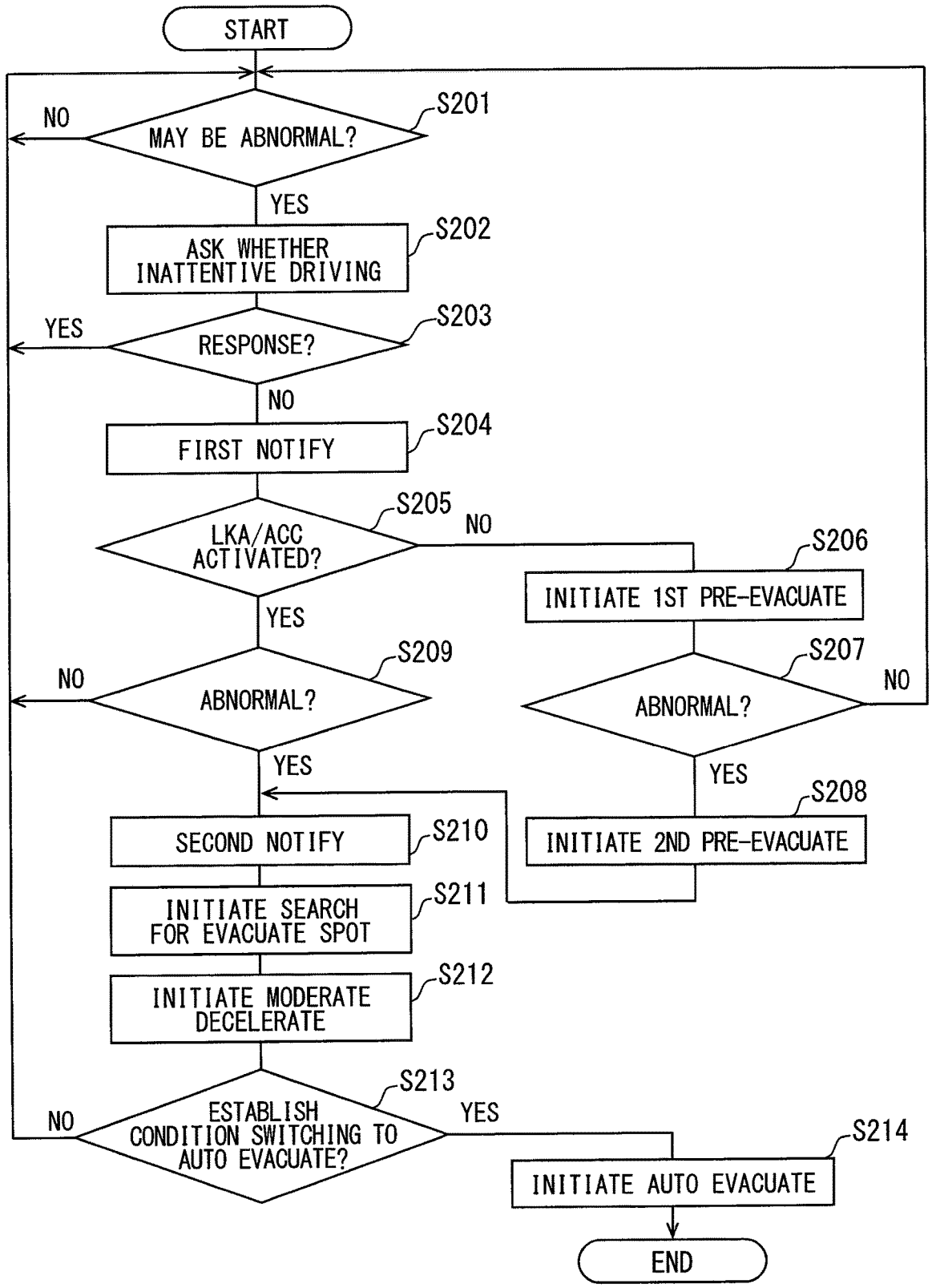
FIG. 24 is a diagram illustrating a modification of FIG. 17.
Figure 25:
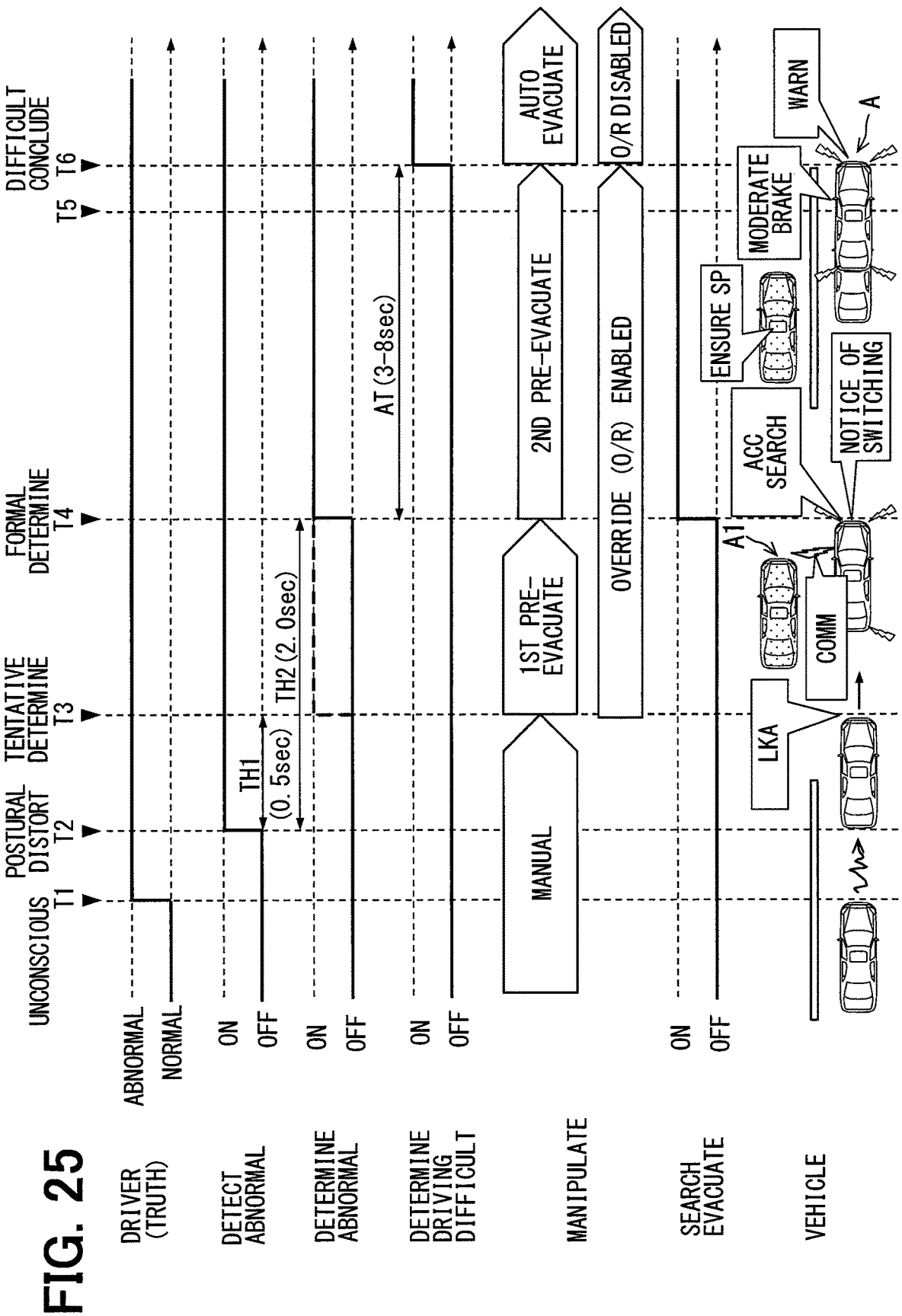
FIG. 25 is a diagram illustrating another modification of FIG. 4.
Figure 26:
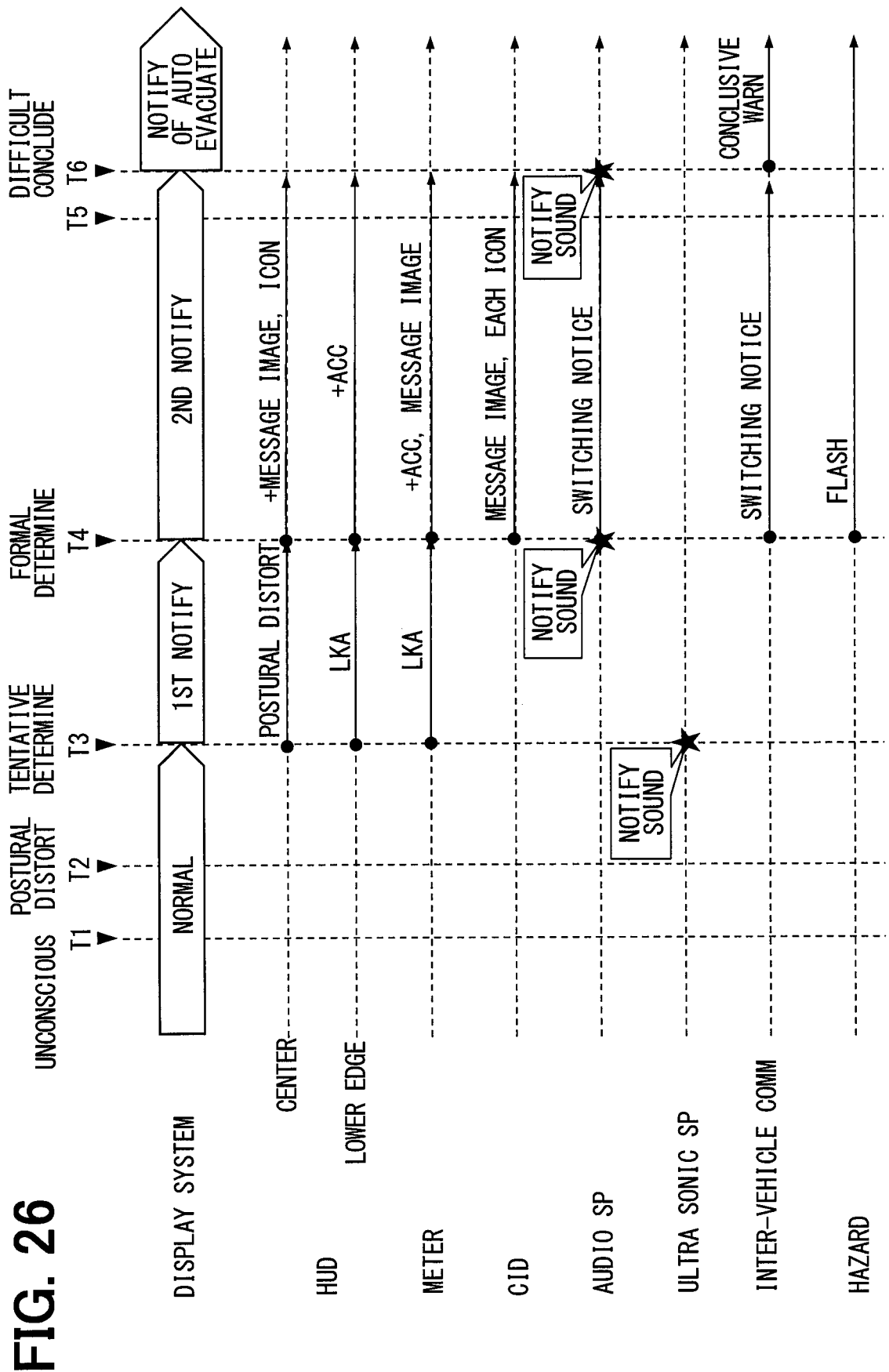
FIG. 26 is a diagram illustrating another modification of FIG. 5.
Figure 27:
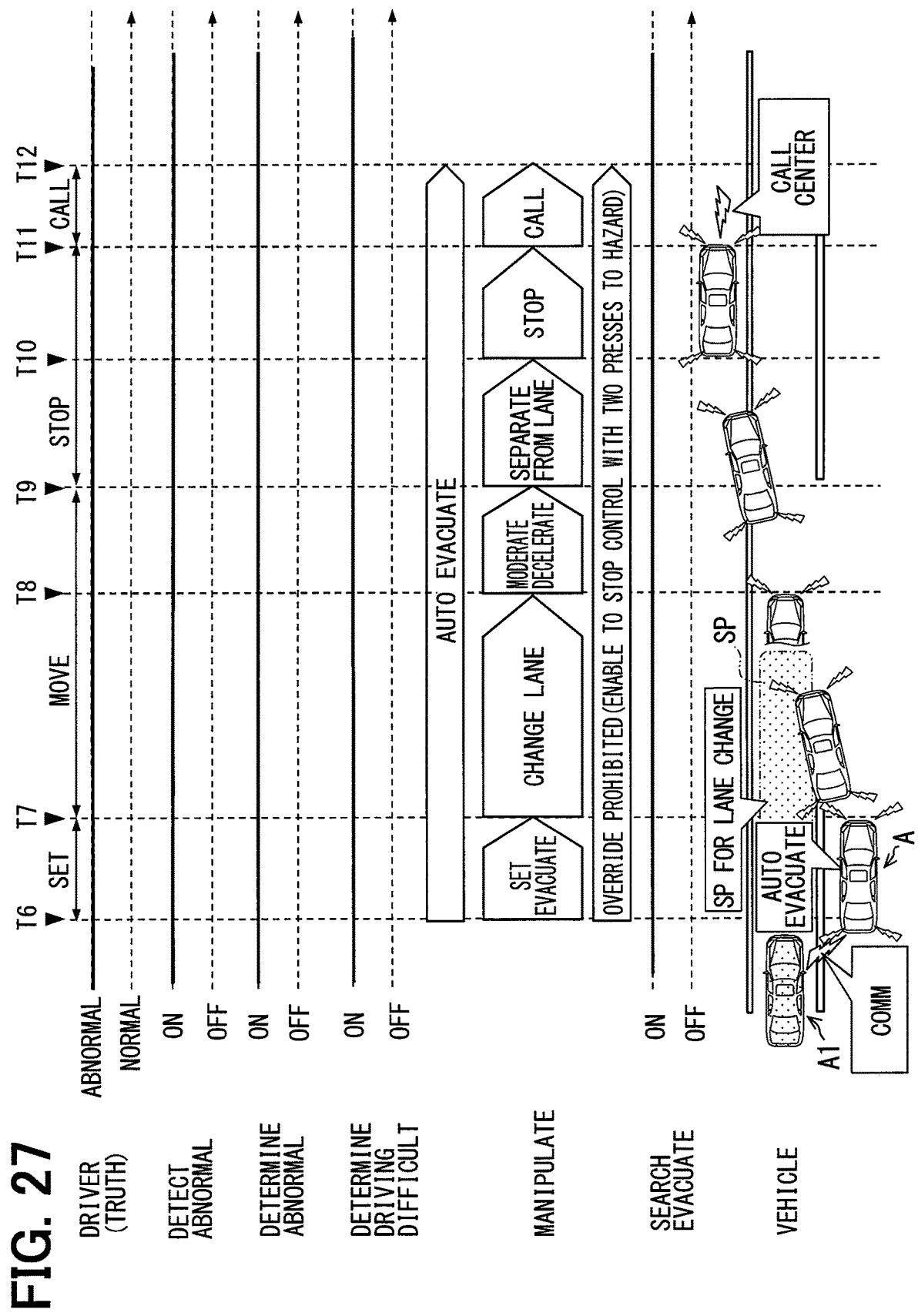
FIG. 27 is a diagram illustrating a modification of FIG. 6.
Figure 28:
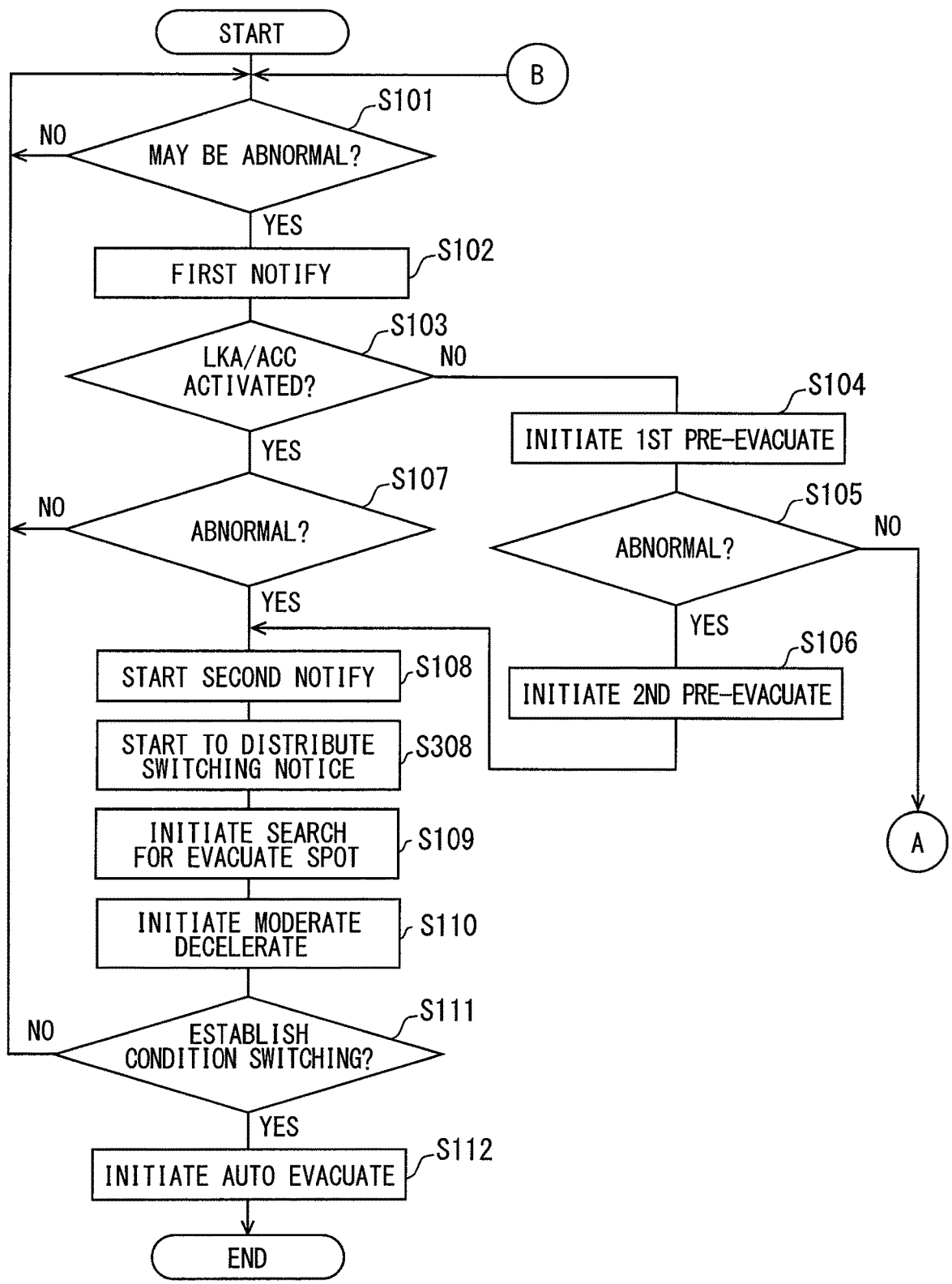
FIG. 28 is a diagram illustrating another modification of FIG. 17.

A second embodiment of the present disclosure is illustrated in FIGS. 22 to 24. The second embodiment is obtained by modifying the first embodiment. If the driver does not respond to a notification of postural distortion that is issued based on a tentative determination, the second embodiment activates the LKA as a driving assistance function. A pre-evacuation control process according to the second embodiment will be described below based on FIGS. 22 and 23 while referring to FIGS. 1 to 3. A process performed before tentative determination (before T23) and a process performed after formal determination (after T25) are substantially the same as those in the first embodiment and will not be redundantly described.

When an abnormal state is tentatively determined to exist (T23), the postural distortion icon 45 (see FIG. 10) is projected onto the projection area 14a based on such a tentative determination in order to notify the driver that an abnormality, such as a postural distortion, is detected. The postural distortion icon 45 has a function for asking the driver whether the driver is engaged in inattentive driving. Additionally, the ultrasonic speakers 113 emit a notification sound based on the tentative determination only toward the driver. The above-described notification is implemented by the function of the abnormality notification section 84, which is provided by the control circuit 70a.

Next, the function of the response determination section 86 is exercised to determine whether the driver has responded to a notification performed by the postural distortion icon 45 and the notification sound based on the result of detection by the DSM 11 during a fixed inquiry time IT (e.g., approximately 1 second) after the tentative determination. If the result of such an intention confirmation process indicates that the driver has not responded to the notification from the HMI system 10 (see FIG. 10), the LKA is activated for first pre-evacuation control (T24). The combination meter 12 and the HUD apparatus 14 (see FIGS. 9 and 10) display information to issue the first notification. If the postural distortion continues for the second threshold period of time TH2, the vehicle control ECU 70 formally determines that the abnormal state exists (T25). Second pre-evacuation control is initiated based on such a formal determination.

Figure 10:
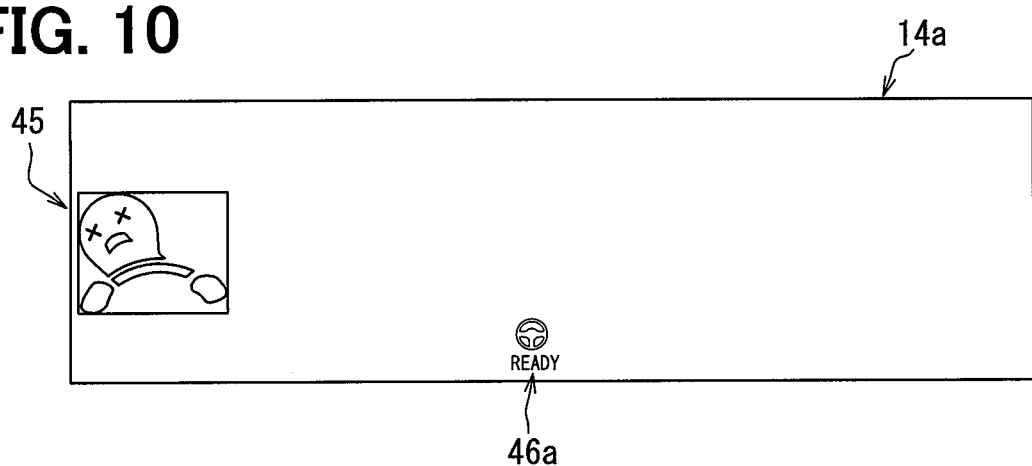
FIG. 10 is a diagram illustrating information that is projected by an HUD apparatus when the first notification is generated.

A process performed by the control circuit 70a to initiate the above-described pre-evacuation control will now be described in detail based on FIG. 24 while referring to FIG. 10. Processing in S113 to S115 (see FIG. 18) of the first embodiment is omitted from the second embodiment. Processing in S201 and S204 to S214 is substantially the same as the processing in S101 to S112 of the first embodiment.

In S202, which is performed based on the tentative determination of an abnormal state in S201, the postural distortion icon 45 is displayed in the projection area 14a in order to ask the driver whether the driver is engaged in inattentive driving. Processing proceeds to S203. In S203, it is determined whether the driver has responded to the inquiry made in S202. If a response from the driver, or more specifically, any improvement in the posture and face orientation of the driver, is detected, processing returns to S201. By contrast, if it is determined that the driver has not responded to the inquiry, processing proceeds to S204. This initiates first pre-evacuation control.

The second embodiment, which has been described above, is able to properly switch to automatic evacuation control by exerting the same advantageous effects as the first embodiment. Further, the second embodiment first issues a notification to the driver in order to report an abnormality detected by the DSM 11. This permits the driver in a normal state to correct the posture or look ahead in response to the notification. Therefore, if a process is performed to activate the LKA only when the driver has not responded to a notification indicative of a detected abnormality, driving assistance control can be prevented from being initiated due to erroneous detection. This avoids a situation where the driver is bothered by a configuration for proper switching to automatic evacuation control.

Third Embodiment

A third embodiment of the present disclosure is illustrated in FIGS. 25 to 28. The third embodiment is obtained by modifying the first embodiment. The vehicle exterior notification section 89 (see FIG. 3) according to the third embodiment establishes vehicle-to-vehicle communication to distribute a predictive warning (hereinafter referred to as "switching notice distribution") before distributing a warning based on the initiation of automatic evacuation control (hereinafter referred to as "conclusive warning distribution"). Switching notice distribution notifies a different vehicle A1 of the possibility of the driver of the vehicle A having difficulty in driving. Switching notice distribution is initiated together with the second notification (see T4 of FIG. 25 and S308 of FIG. 28) when the driver does not respond to the first notification and is formally determined to be abnormal. Based on the determination of the driving difficulty state, switching notice distribution continues until conclusive warning distribution is initiated (T6).

Switching notice distribution is performed to request the driver or automatic driving system of the different vehicle A1 to provide the vehicle A with a movement path for evacuation traveling by reporting the possibility of switching to evacuation traveling before the initiation of automatic evacuation control. Such preliminary warning distribution indicates an action that should be taken by the different vehicle A1 traveling in the vicinity of the vehicle A. Upon receipt of a distributed switching notice, the driver or automatic driving system of the different vehicle A1 can provide the vicinity of the vehicle A with a movement space SP for deceleration or lane change (see FIG. 27). Accordingly, the vehicle A can switch to evacuation traveling immediately after the planned travel path to the evacuation spot is generated (T7).

More specifically, switching notice distribution is performed to establish vehicle-to-vehicle communication with the different vehicle A1 in order to report the possibility of the driver of the vehicle A being in an abnormal state, and for example, the cause or reason for formal determination of the abnormal state. Additionally, switching notice distribution is performed to notify the different vehicle A1 that behavior changes for evacuation traveling, such as, deceleration, lane change, and stop, are about to occur. Further, switching notice distribution can be performed to provide the different vehicle A1 with, for example, position information about an evacuation spot candidate being searched for by the surroundings monitoring ECU 91. Moreover, when switching notice distribution is performed, the vehicle exterior notification section 89 (see FIG. 3) intermittently illuminates the hazard lamps of the vehicle A. The hazard lamps are intermittently illuminated at the same time the vehicle-to-vehicle communication is established to convey the information. Therefore, the position of the vehicle A, which is likely to start evacuation traveling, is reported to the different vehicle A1 in an easy-to-understand manner.

Meanwhile, conclusive warning distribution (T6) is performed, more specifically, to notify a different vehicle A1 traveling in the vicinity of the vehicle A of a desired action to be taken by the different vehicle A1. For example, the different vehicle A1 is requested to decelerate for increasing the inter-vehicle distance to the vehicle A or accelerate for overtaking the vehicle A in order to obtain the movement space SP for deceleration or lane change of the vehicle A. Further, conclusive warning distribution is performed to establish vehicle-to-vehicle communication to notify the different vehicle A1 of the planned travel path to the evacuation spot formally determined by the setup process.

Figure 29:
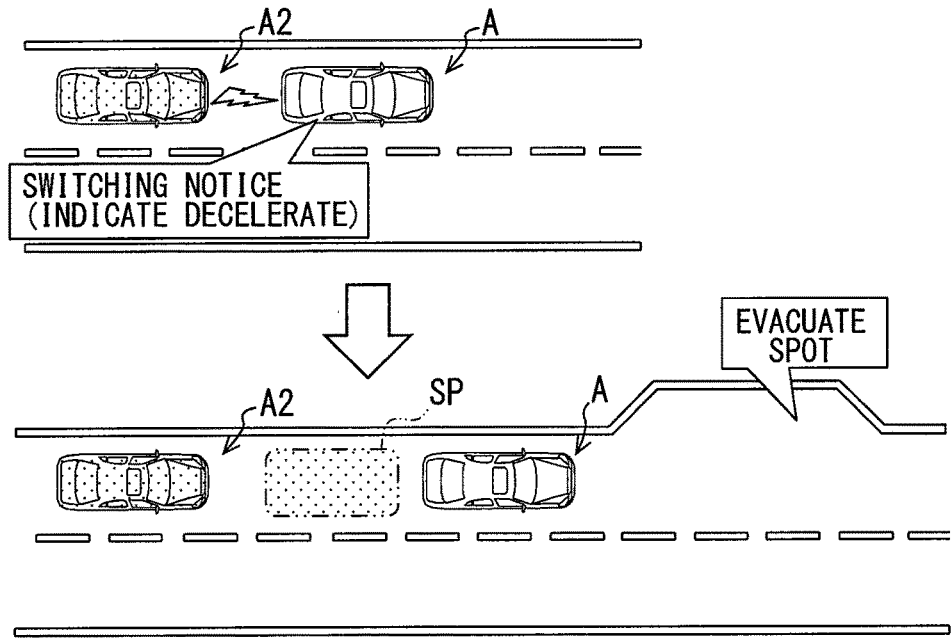
FIG. 29 is a diagram illustrating an example of a scene where switching notice distribution is valid.

Switching notice distribution described above is particularly effective in scenes in FIGS. 29 and 30. In the scene in FIG. 29, a following vehicle A2 exists in the rear vicinity of the vehicle A whose driver is in the driving difficulty state. The in-vehicle communicator 97 in the vehicle A is capable of wirelessly establishing vehicle-to-vehicle communication with an in-vehicle communicator in the vehicle A2. In compliance with the transmission request information acquired from the vehicle exterior notification section 89 (see FIG. 3), the in-vehicle communicator 97 (see FIG. 2A) performs switching notice distribution based on the formal determination with respect to the following vehicle A2. This switching notice distribution notifies the following vehicle A2 of the possibility of deceleration for evacuation traveling to the evacuation spot currently searched for. As a result, the following vehicle A2 may increase the inter-vehicle distance to the vehicle A in order to provide the movement space SP for deceleration between the vehicle A and the following vehicle A2. The vehicle A2 in which an in-vehicle communicator is mounted is referred to also as an equipped vehicle or a host vehicle in relation to the in-vehicle communicator.

Figure 30:
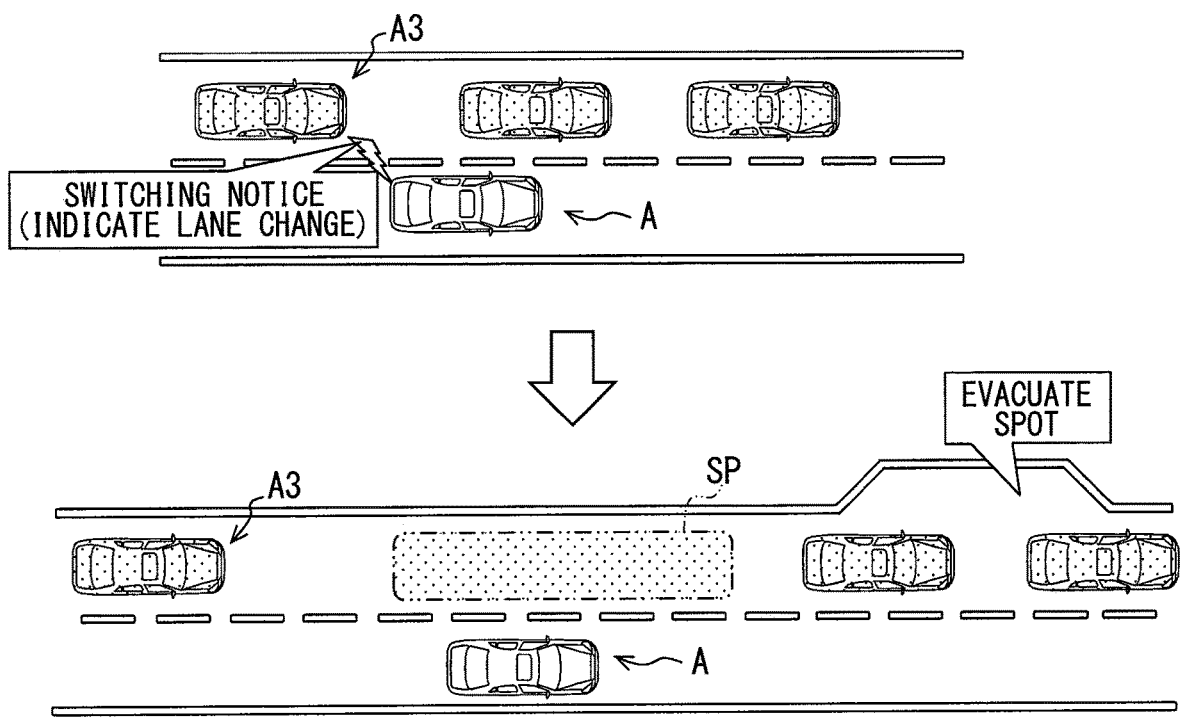
FIG. 30 is a diagram illustrating an example of a scene where switching notice distribution is valid.

In the scene in FIG. 30, a plurality of parallel traveling vehicles exist laterally to the vehicle A whose driver is in the driving difficulty state. The vehicle A is traveling in a passing lane while the parallel traveling vehicles are traveling in a cruising lane. In this scene, the in-vehicle communicator 97 (see FIG. 2A) performs switching notice distribution based on the formal determination with respect to a parallel traveling vehicle A3 that is traveling laterally behind the vehicle A. The in-vehicle communicator 97 in the vehicle A is capable of wirelessly establishing vehicle-to-vehicle communication with an in-vehicle communicator in the parallel traveling vehicle A3. The parallel traveling vehicle A3 is notified of the possibility of a lane change for evacuation traveling to the evacuation spot currently searched for. The parallel traveling vehicle A3 may therefore increase the inter-vehicle distance to a preceding vehicle in order to provide the movement space SP for the lane change. The parallel traveling vehicle A3 in which an in-vehicle communicator is mounted is referred to also as an equipped vehicle or a host vehicle in relation to the in-vehicle communicator.

The above-described third embodiment is also able to properly switch to automatic evacuation control by exerting the same advantageous effects as the first embodiment. Further, the third embodiment sends an advance notice to a different vehicle A1 in order to indicate the possibility of the driving difficulty state by performing switching notice distribution based on the formal determination. In this manner, the different vehicle A1 is urged to take an action for providing assistance to the evacuation traveling of the vehicle A. This enables the vehicle A to smoothly move to the evacuation spot after switching to automatic evacuation control.

Alternative Embodiments

While the present disclosure has been described in terms of particular embodiments, it should not be interpreted as being limited to the above-described embodiments. The present disclosure can also be applied to various other embodiments and their combinations without departing from the spirit and scope of the present disclosure.

In the foregoing embodiments, second pre-evacuation control for activating the ACC is initiated in addition to first pre-evacuation control for activating the LKA before the initiation of automatic evacuation control. Alternatively, however, only the LKA may be activated as a driving assistance function before the initiation of automatic evacuation control. Further, three or more driving assistance functions may be activated by the vehicle control ECU before the initiation of automatic evacuation control. Furthermore, the LKA and the ACC may be activated at substantially the same time. A point of time when pre-evacuation control is initiated may be changed as appropriate. Moreover, the LKA may incorporate not only a function for keeping the vehicle A in a particular lane on a straight road, but also a function for keeping the vehicle A within a particular lane on a curved road and allowing the vehicle A to travel along the curved road.

In the foregoing embodiments, the DSM detects an abnormality of the driver, such as postural distortion. However, the element for acquiring information about the driver is not limited to the DSM. Based, for example, on biological information about the driver, which is transmitted from a wearable device attached to the driver, the vehicle control ECU is capable of determining whether the driver is abnormal. The biological information includes information about a pulse rate, a heart rate, and a body temperature.

In the foregoing embodiments, an override can be enabled during automatic evacuation control by pressing the hazard switch two times in succession. However, the procedure for enabling the override is not limited to pressing the hazard switch two times in succession, but can be changed as appropriate. Further, the override may remain disabled during automatic evacuation control. Furthermore, the override may be disabled during pre-evacuation.

Based on the detection of an abnormal state, the foregoing embodiments use the display devices and acoustic devices to send a notification to the driver. Alternatively, however, such a notification may be sent to the driver by using either the display devices or the acoustic devices. Additionally, a tactile notification may be sent to the driver by using, for example, a vibration device built in the driver seat or the steering wheel.

The foregoing embodiments perform switching notice distribution and conclusive warning distribution with respect to a different vehicle by establishing vehicle-to-vehicle communication with in-vehicle communicators and intermittently illuminating the hazard lamps. However, the elements available for warning distribution are not limited to the above-mentioned ones. For example, an electronic notice board for vehicle exterior notification may be mounted on a vehicle with its display surface facing outward and used to perform warning distribution. More specifically, switching notice distribution and conclusive warning distribution may be performed by displaying messages such as "ABNORMALITY DETECTED" and "TRAVELING FOR EVACUATION." Further, switching notice distribution may be initiated between tentative determination and formal determination or initiated at a point of time when an evacuation spot candidate is found after formal determination.

Vehicle occupants having no experience with automatic evacuation control exercised by the foregoing embodiments are likely to feel uneasy about exercising automatic evacuation control in emergency. Therefore, when, for example, the vehicle A is stationary, the HCU may be capable of executing a demonstration mode for allowing the vehicle occupants to simulatively experience the processes performed under pre-evacuation control and automatic evacuation control.

The functions provided by the processor 71 in the control circuit 70a according to the foregoing embodiments may be provided by different hardware, software, or their combinations. For example, the processors in the surroundings monitoring ECU and HCU may execute some of the processes for implementing pre-evacuation control and automatic evacuation control to which a travel control method provided by the present disclosure is applied.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. A travel control apparatus comprising:
at least one processor configured to:
acquire information indicating that an abnormality of a driver of a vehicle is detected, from a driver status monitor configured to capture an image of the driver to automatically detect the abnormality of the driver;
make a determination that the driver is in a driving difficulty state, in response to the abnormality of the driver being detected continuously; and
initiate an automatic evacuation control, based on determining that the driver is in the driving difficulty state, the automatic evacuation control being configured to execute a plurality of processes to automatically stop the vehicle,
wherein the at least one processor is further configured to:
determine whether a lane departure prevention function of the vehicle and a cruise control function of the vehicle are activated,
upon determining that the lane departure prevention function and the cruise control function are not activated, activate the lane departure prevention function of the vehicle and the cruise control function of the vehicle, both of which are not activated, at substantially the same time during an interval from when the abnormality of the driver is detected to when the driving difficulty state of the driver is determined;
together with activating the lane departure prevention function and the cruise control function, output first notification request information to a human machine interface (HMI) controller controlling a notification device which issues a notification to a passenger of the vehicle, the first notification request information causing a notification indicative of activation of the lane departure prevention function and the cruise control function to be issued; and
together with initiating the automatic evacuation control, output second notification request information to the HMI controller, the second notification request information causing issue of a notification descriptive of one of the processes configured to be executed by the automatic evacuation control, the one of the processes being currently executed by the automatic evacuation control.

2. A travel control apparatus comprising:
at least one processor configured to:
acquire information indicating that an abnormality of a driver of a vehicle is detected, from a driver status monitor configured to capture an image of the driver to automatically detect the abnormality of the driver;
make a determination that the driver is in a driving difficulty state, in response to the abnormality of the driver being detected continuously; and
initiate an automatic evacuation control, based on determining that the driver is in the driving difficulty state, the automatic evacuation control being configured to automatically stop the vehicle,
wherein the at least one processor is further configured to:
determine whether a lane departure prevention function of the vehicle and a cruise control function of the vehicle are activated;
upon determining that the lane departure prevention function and the cruise control function are not activated, activate the lane departure prevention of the vehicle and the cruise control function of the vehicle, both of which are not activated, at substantially the same time during an interval from when the abnormality of the driver is detected to when the driving difficulty state of the driver is determined;
together with activating the lane departure prevention function and the cruise control function, output first notification request information to a human machine interface (HMI) controller controlling a notification device which issues a notification to a passenger of the vehicle, the notification request information causing a notification indicative of activation of the lane departure prevention function and the cruise control function to be issued; and
output second notification request information to the HMI controller, the second notification request information causing a notification descriptive of how to stop the automatic evacuation control to be issued.

3. A travel control apparatus comprising:
at least one processor configured to:
acquire information indicating that an abnormality of a driver of a vehicle is detected, from a driver status monitor configured to capture an image of the driver to automatically detect the abnormality of the driver;
make a determination that the driver is in a driving difficulty state, in response to the abnormality of the driver being detected continuously; and
initiate an automatic evacuation control, based on determining that the driver is in the driving difficulty state, the automatic evacuation control being configured to automatically stop the vehicle,
wherein the at least one processor is further configured to:
determine whether a lane departure prevention function of the vehicle and a cruise control function of the vehicle are activated;
upon determining that the lane departure prevention function and the cruise control function are not activated, activate the land departure prevention function of the vehicle and the cruise control function of the vehicle, both of which are not activated, at substantially the same time during an interval from when the abnormality of the driver is detected to when the driving difficulty state of the driver is determined;
initiate a first vehicle deceleration control during an interval from when the lane departure prevention function and the cruise control function are activated to when the driving difficulty state of the driver is determined; and
based on determining the driving difficulty state of the driver, initiate the automatic evacuation control, the automatic evacuation control being configured to:
cause the vehicle to make a lane change in a direction to approach a road strip or a road shoulder;
initiate a second vehicle deceleration control of the vehicle after the lane change; and
cause the vehicle to move into the road strip or the road shoulder after the second deceleration control.

4. A travel control apparatus comprising:
at least one processor configured to:
acquire driver abnormality information indicating an abnormality of a driver of a subject vehicle;

make a determination that the driver is in a driving difficulty state, based at least on the driver abnormality information;

determine whether a lane departure prevention function of the vehicle and a cruise control function of the vehicle are activated, upon determining that the lane departure prevention function and the cruise control function are not activated, activate the lane departure prevention function of the subject vehicle and the cruise control function of the subject vehicle, both of which are not activated, at substantially the same time during a time period between when the driver abnormality information is acquired and when the driving difficulty state is determined; and together with activating the lane departure prevention function and the cruise control function, output notification request information to a human machine interface controller controlling a notification device which issues a notification to an occupant on one of passenger seats of the subject vehicle, wherein the notification request information causes the notification indicative of activation of the lane departure prevention function and the cruise control function to be issued.

* * * * *